United States Patent
Edwards

(10) Patent No.: US 12,177,648 B2
(45) Date of Patent: Dec. 24, 2024

(54) SYSTEMS AND METHODS FOR ORIENTATION-RESPONSIVE AUDIO ENHANCEMENT

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 81 days.

(21) Appl. No.: 17/849,137

(22) Filed: Jun. 24, 2022

(65) Prior Publication Data

US 2023/0421983 A1    Dec. 28, 2023

(51) Int. Cl.
H04S 7/00       (2006.01)
G06F 3/01       (2006.01)
G06F 3/16       (2006.01)

(52) U.S. Cl.
CPC .............. *H04S 7/303* (2013.01); *G06F 3/013* (2013.01); *H04S 2400/01* (2013.01); *H04S 2400/11* (2013.01)

(58) Field of Classification Search
USPC ....... 381/1, 17–23, 300, 303, 306, 307, 309, 381/310, 311, 58, 61, 74, 104, 370, 124
See application file for complete search history.

(56) References Cited

U.S. PATENT DOCUMENTS

| | | |
|---|---|---|
| 10,397,727 B1 | 8/2019 | Schissler |
| 10,820,121 B2 | 10/2020 | Lunner et al. |
| 2003/0053680 A1 | 3/2003 | Lin et al. |
| 2012/0114130 A1 | 5/2012 | Lovitt |
| 2014/0328505 A1* | 11/2014 | Heinemann ............. G06F 3/012 381/303 |
| 2017/0323158 A1* | 11/2017 | Gordon ............... G06F 16/5866 |
| 2018/0139562 A1 | 5/2018 | Eronen et al. |
| 2019/0139312 A1 | 5/2019 | Leppänen et al. |
| 2019/0166448 A1 | 5/2019 | Laaksonen et al. |
| 2019/0174237 A1* | 6/2019 | Lunner ................ H04R 1/1041 |
| 2019/0191264 A1 | 6/2019 | Lehtiniemi et al. |
| 2019/0369722 A1* | 12/2019 | Lehtiniemi .......... G06F 3/0304 |
| 2021/0258709 A1 | 8/2021 | Jang et al. |
| 2022/0214858 A1* | 7/2022 | Karri ...................... G06F 18/24 |
| 2023/0421984 A1 | 12/2023 | Edwards |

FOREIGN PATENT DOCUMENTS

KR    102311024 B1    10/2021

OTHER PUBLICATIONS

Jang et al, English translation of KR102311024 provided by EPO. 10 pages. (Year: 2017).*
U.S. Appl. No. 17/849,148, filed Jun. 24, 2022, Warren Keith Edwards.

\* cited by examiner

*Primary Examiner* — Qin Zhu
(74) *Attorney, Agent, or Firm* — HALEY GUILIANO LLP

(57) ABSTRACT

Sound objects are identified within a content item, and location metadata is extracted from the content item for each sound object. A reference layout is generated, relative to a user position, for the sound objects based on the location metadata. A user's gaze is then determined using pupil tracking, body movement data, head orientation data, or other techniques. Using the reference layout, a sound object along a path defined by the gaze of the user is identified, and audio of the identified object is enhanced.

24 Claims, 16 Drawing Sheets

SYSTEMS AND METHODS FOR ORIENTATION-RESPONSIVE AUDIO ENHANCEMENT

BACKGROUND

This disclosure is directed to intelligibility of audio in content items. In particular, techniques are disclosed for enhancing audio of specific sound objects based on an orientation of the user.

SUMMARY

Human speech can often be difficult to understand and follow, especially in video content with complex audio structures (such as multiple voices, sound effects, musical soundtracks, and so forth). Existing solutions for improving the intelligibility of voice content, which often focus on simple methods such as differential equalization, are imperfect.

While these techniques can be somewhat effective, they do not exploit more modern video content formats, nor do they take advantage of current listening technology. In a nutshell, the above techniques were developed in a world of simple stereo or basic multi-channel audio tracks, rather than more sophisticated formats such as Dolby Atmos. These techniques also assume that viewers are receiving audio content through fixed speakers or basic analog headphones, and thus do not take advantage of capabilities such as spatialization, head tracking, or advanced audio sensing, which are present in more modern earbuds with inertial measurement units (IMUs), accelerometers, and advanced computational ability. These more advanced platforms support innovation in techniques that have the potential to greatly increase the intelligibility of voice signals in video content.

Current technologies to enhance the intelligibility of speech tracks in video content are fairly limited, and are based on simple signal processing techniques. These generally fall into two categories. The first is differential equalization, in which a band pass filter is applied to the overall audio track. Sound frequencies in the typical voice range of 125 Hz to about 3,500 Hz are amplified, while sounds in frequencies outside this range have their volume slightly decreased. While straightforward to implement, this technique is imperfect, not least because other, non-voice sounds that happen to be in this frequency band will also have their amplitude increased, conflating voice and non-voice sounds within this range.

A second common technique is to attempt to isolate voice tracks and redirect them toward a center-channel speaker (common in a 5.1 or other multi-channel sound system); this center-channel speaker is often optimized for production of audio in the typical voice range, and thus provides a consistent and stronger presentation of any content identified as (or suspected to be) voice. This technique also has flaws. Namely, the process of identifying sound as "voice" often relies on the same simple frequency filtering as described above, which means that other non-voice sounds may be captured. Sounds identified as voice are then redirected toward the center channel, regardless of the position of the originator of that sound in the video content. For example, in a film of a person speaking off to the left in a scene, the corresponding voice content would most naturally come from the left channel speaker. However, this technique results in that voice content being redirected toward the center.

Additionally, a further technique that is related to improving voice intelligibility is active noise cancellation (ANC). ANC can be used in a headphone-based scenario: by analyzing the ambient audio environment around a listener, counteracting sound waveforms can be generated that cancel out that ambient audio, leading to overall increased intelligibility of the audio being streamed through the headphones.

A key aspect of the techniques presented in this invention is that they leverage the increasing prevalence of spatial audio in the AV realm. Spatial audio is a technique by which digitally recorded or generated sound can be processed such that it appears to come from a particular location when perceived by a listener. Increasingly, modern AV formats such as Dolby Atmos have provided what is sometimes termed an "object oriented" sound format, in which each individual sound source is represented as a "sound object" that has a location encoded with it. This location encoding information is then used to generate a spatial presentation as the content is rendered.

Notably, from a human perception standpoint, audio that is spatialized has a number of benefits. These include the ability of humans to selectively attend to one out of many audio sources that are spatialized. Sometimes called the "cocktail party effect," this ability lets us "tune in" to one voice out of many in a crowded environment and is not possible when sound sources are presented in a simple stereo mix. Also, humans often adjust head position to orient toward a sound source they wish to focus on. This can both improve separation from other sound sources in the environment and enhance intelligibility of that audio content.

Separate, and related to this invention, is the growing use of headphones and earbuds that contain inertial measurement capabilities, accelerometers, and other sensors that can determine head position and orientation in real time. Such abilities can be coupled with spatial sound systems to allow them to be responsive to a user's head orientation, such that the computation of spatial sound properties is updated as the head moves.

This invention describes a set of dynamic techniques that can be applied in the context of modern AV formats and listening technology to improve voice intelligibility. These are focused around leveraging and enhancing interactions with spatial audio to enhance intelligibility. A first technique is orientation-responsive audio enhancement. This allows a user to reorient their head toward a virtual sound source to selectively focus on that source. In real time, the system determines which sound object is being faced and enhances the intelligibility of that object. The effect is intended to mimic the way we turn toward a human speaker in order to better attend to them. By determining the position of other users in the environment, the same technique can be applied to conversational audio from those other users, allowing one to orient toward either recorded audio sources, or live human audio sources, and applying the same enhancement effects.

A second technique describe herein is dynamic spatial separation, in which the virtual position of sounds that are clustered together within a content item are separated in real time to increase user intelligibility of the sounds. Human performance at voice intelligibility is enhanced when sound sources are spatialized. This technique of de-clustering grouped sound sources that are at the same or similar locations yields better intelligibility.

A third technique described in this disclosure is frequency spreading to enhance localization performance. Human performance at localization of sounds is better for broadband audio sources than narrowband ones. This technique describes a method to dynamically spread the frequency spectrum of the sounds in order to enhance localization performance, and hence potential intelligibility.

Systems and methods are described herein for orientation-responsive audio enhancement. Sound objects are identified within a content item, and location metadata is extracted from the content item for each sound object. A reference layout is generated, relative to a user position, for the sound objects based on the location metadata. A user's gaze is then determined using pupil tracking, body movement data, head orientation data, or other techniques. Using the reference layout, a sound object along a path defined by the gaze of the user is identified, and audio of the identified object is enhanced. Enhancement may be accomplished by modifying the amplitude of audio of at least one sound object. For example, the amplitude of audio of the identified sound object may be increased. Alternatively or additionally, amplitude of audio of other sound objects may be reduced.

In some embodiments, audio from other users who are nearby (or depicted as being nearby within a virtual environment) may be included with the identified sound objects. A location for each other user is determined and included in the reference layout. Thus, audio enhancement of speech of another user may be performed if the user's gaze is toward the other user.

Multiple sound objects may be located along the path defined by the user's head orientation. The user's head orientation can be derived from various sensors, such as inertial measurement units and accelerometers, as well as by imaging sensors used to detect the head orientation or the gaze of the user. Audio of a first sound object along the path is enhanced. A negative input may be received from the user, such as a gesture, speech input, or command from an input device. In response to the negative input, enhancement of the audio of the first sound object is stopped. A second sound object along the path is selected and audio of the second sound object is enhanced instead.

When multiple sound objects are located along the path defined by the user's gaze, respective audio of each sound object may be analyzed to determine what type of audio the sound object is producing. It may be determined that audio of one of the sound objects contains a voice. If so, that sound object may be selected for enhancement. In other embodiments, a representation of each sound object may be generated for display. Further changes in the gaze of the user resulting in one representation being along the path of the user's gaze can be used to select a single sound object for enhancement.

In some embodiments, an initial gaze is identified for the user. Movement data is then received. For example, a camera may track movement of the user. Alternatively or additionally, a smart device or wearable device of the user may transmit inertial movement data, accelerometer data, or other data indicative of movement to the system. Using the movement data, a new gaze of the user can be determined.

Also described in this disclosure are systems and methods for dynamic spatial separation of sound sources in a content item. After generating a reference layout, relative to the user position, of the sound objects in the content item based on the location metadata, it is determined whether a first sound object is within a threshold angle, relative to the user position, of a second sound object. If so, a virtual position of either the first sound object or the second sound object is adjusted by an adjustment angle. If a change in virtual position is detected, the threshold angle and adjustment angle are both decreased. In some embodiments, the threshold angle is scaled based on the distance between the user and the sound source due to the increase in linear distance corresponding to a given angular distance as the sound source moves farther from the user. The adjustment angle may be similarly scaled in some cases.

In some embodiments, it is determined whether one of the first sound object and the second sound object contains a voice. If the first sound object contains a voice, the virtual position of the second sound object may be adjusted by the adjustment angle. This leaves the virtual position of the first sound object aligned with the displayed position of the speaker whose voice is contained in the first sound object.

The dynamic spatial separation process may be performed iteratively. In some embodiments, after adjusting the virtual position of either the first sound object or the second sound object, the threshold angle and adjustment angle are decreased. A third sound object may be within the decreased threshold angle of either the first sound object or the second sound object. If so, the virtual position of the third sound object is adjusted by the decreased adjustment angle. The threshold and adjustment angles are decreased again. This process iterates until no more adjustments are needed, or until the threshold and/or adjustment angle reaches a minimum value.

If more than two sound objects are clustered together, a virtual position of the first sound object may be adjusted by an adjustment angle, relative to the user position, in a direction that increases the distance between the first sound object and both the second and third sound objects. Likewise, a virtual position of the second sound object may be adjusted by the adjustment angle, relative to the user position, in a direction that increases the distance between the second sound object and both the first and third sound objects. The virtual position of the third sound object is not adjusted. This results in a virtual spreading out of the three sound objects.

This disclosure also describes enhancing user localization of sounds using frequency spreading. For a given sound, a highest frequency component and a lowest frequency component are identified. For example, a Fourier transform operation may be used to convert the sound from a time-domain signal to a frequency-domain signal. The highest and lowest frequency components of the signal can then be determined. A difference between the highest and lowest frequency components is then calculated. If the difference is within a threshold frequency bandwidth, a central frequency point is calculated. Frequency components above the central point are adjusted by a positive adjustment factor while frequency components below the central point are adjusted by a negative adjustment factor. A spectrograph is generated from the adjusted frequencies then processed (e.g., using a reverse Fourier transform operation) to generate a new sound. The new sound, with a wider frequency spread, makes it easier for users to localize the sound.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

In the real world, humans often reorient their heads to focus on a particular sound source. In human-to-human conversation, for example, we often turn toward the speaker; we do this not just out of politeness but also because such a head orientation increases intelligibility of the sound. While there is thus a "natural" improvement of intelligibility due to this action, we can take advantage of orientation-sensing headphones and earbuds to computationally improve intelligibility as well.

With orientation-responsive audio enhancement, the system detects, in real time, the head orientation of the listener and determines the closest spatialized sound object along the user's line of sight ("line of hearing" in this case). Once that sound object has been identified, it is processed to increase the overall amplitude of the output of that sound object, thus increasing its volume, while also potentially decreasing the amplitude of other sound objects. This allows a sort of selective filtering, in which the sound object the user is orienting toward in the moment is assumed to have the user's attention and focus, and thus be selectively enhanced. This effect mimics the real-world experience of orienting toward a sound source one wishes to attend to.

Figure 1:
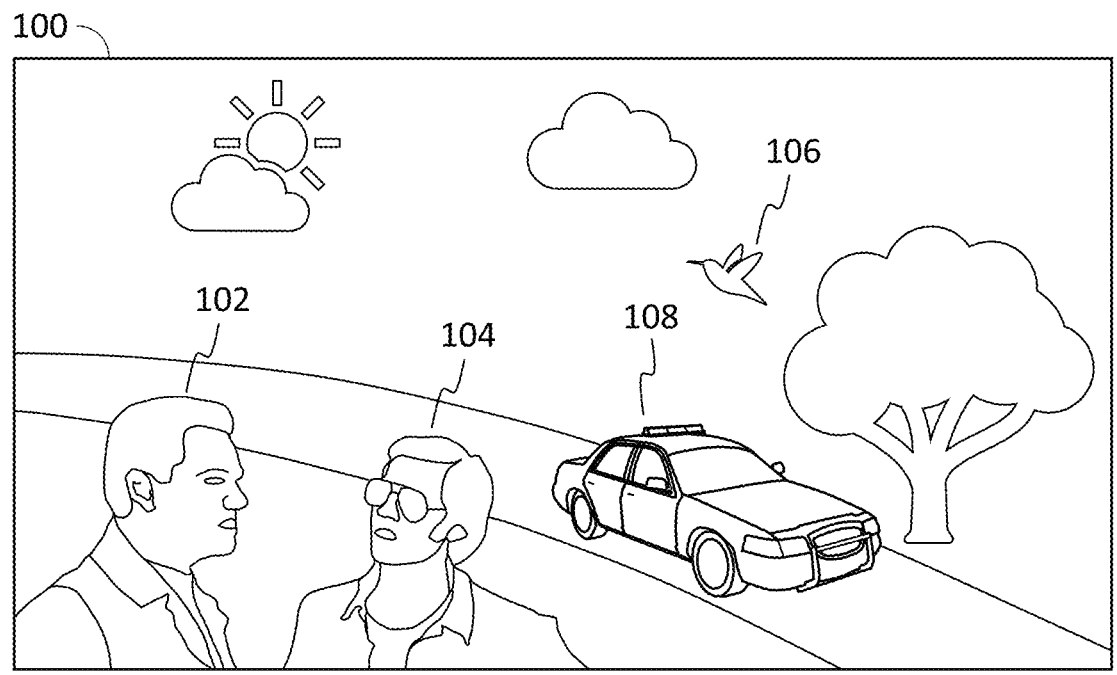
FIG. 1 shows an example of a sound objects in a content item and corresponding location metadata, in accordance with some embodiments of the disclosure.

FIG. 1 shows an example of sound objects in a content item and corresponding location metadata, in accordance with some embodiments of the disclosure. Content item 100 depicts a scene in which multiple objects generate sound. Characters 102 and 104 may be conversing while bird 106 chirps and police car 108 drives by with its sirens on. Each of these sound objects is in a particular location, both on the two-dimensional display of the content item and in the three-dimensional space represented in the content item. Location metadata 110 may be embedded in the content item and provide coordinates for each sound object. The location metadata may, for example, specify [x,y,z] coordinates for each sound object, where the x coordinate represents a horizontal point measured from the center of the frame, the y coordinate represents a vertical point measured from the center of the frame, and the z coordinate represents a distance from the plane defined by the display screen on which content item 100 is output. The units for the x and y coordinates may be different from the units for the z coordinates. For example, the x and y coordinates may be pixels, inches, or centimeters, while the z coordinates may be feet or meters.

Figure 2:
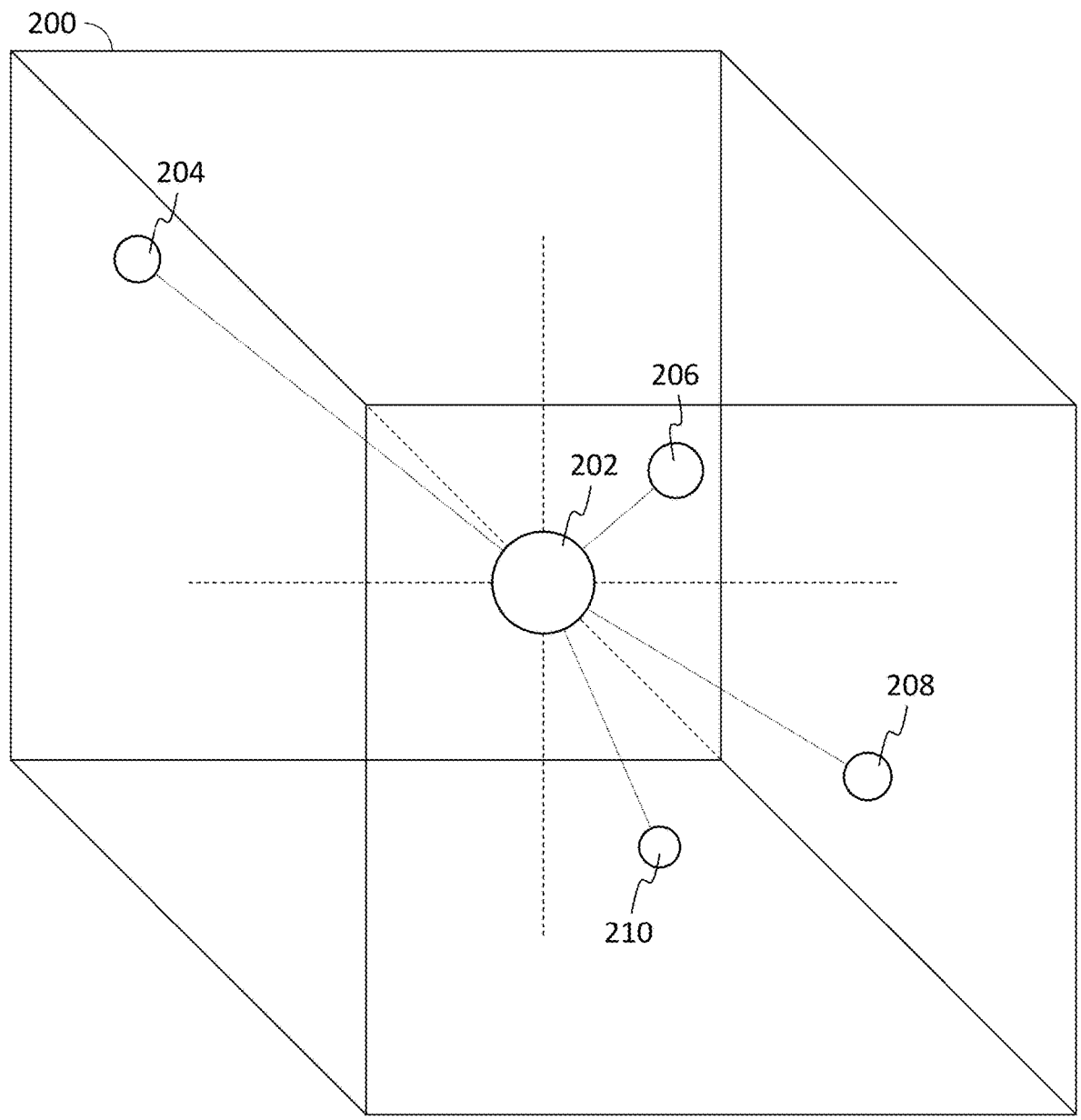
FIG. 2 shows an example of a reference layout, in accordance with some embodiments of the disclosure.

FIG. 2 shows an example of a reference layout, in accordance with some embodiments of the disclosure. Reference layout 200 is generated based on location metadata (e.g., location metadata 110) indicating positions of each sound object relative to the user's position. User position 202 is thus placed in the center of the reference layout. Sound objects 204, 206, 208, and 210 are placed in reference layout 200 according to each sound object's respective location metadata. For surround sound systems, audio for each sound object can be output using appropriately placed speakers in the user's environment to simulate the user's presence within the content item.

In some embodiments, the distance between the user and each sound object, or the position of each sound object, may be modified from the location metadata based on the user's physical position relative to a display screen. The location metadata may provide virtual locations for each sound object relative to a camera perspective or to a plane defined by the two-dimensional display of the content item. A user's location relative to the display can be determined (e.g., using a camera, infrared sensor, or position data from a smart device or wearable device of the user) and the virtual locations for each sound object modified to account for the user's location. For example, location metadata for a sound object may indicate a distance from the camera perspective of ten feet. If the user is sitting six feet from the display, the virtual location of the sound object can be modified to place it sixteen feet away from the user.

A user's viewing angle of the display may also be used to modify the virtual locations of sound objects. For example, the location metadata may indicate a virtual position of a sound object relative to the center of the camera perspective. However, the user may not be positioned directly in front of the display. The user's distance from the display and an angle between a line from the center of the display extending perpendicular to the display and a line from the user's position to the center of the display can be used to triangulate a new virtual position for the sound object.

Figure 3:
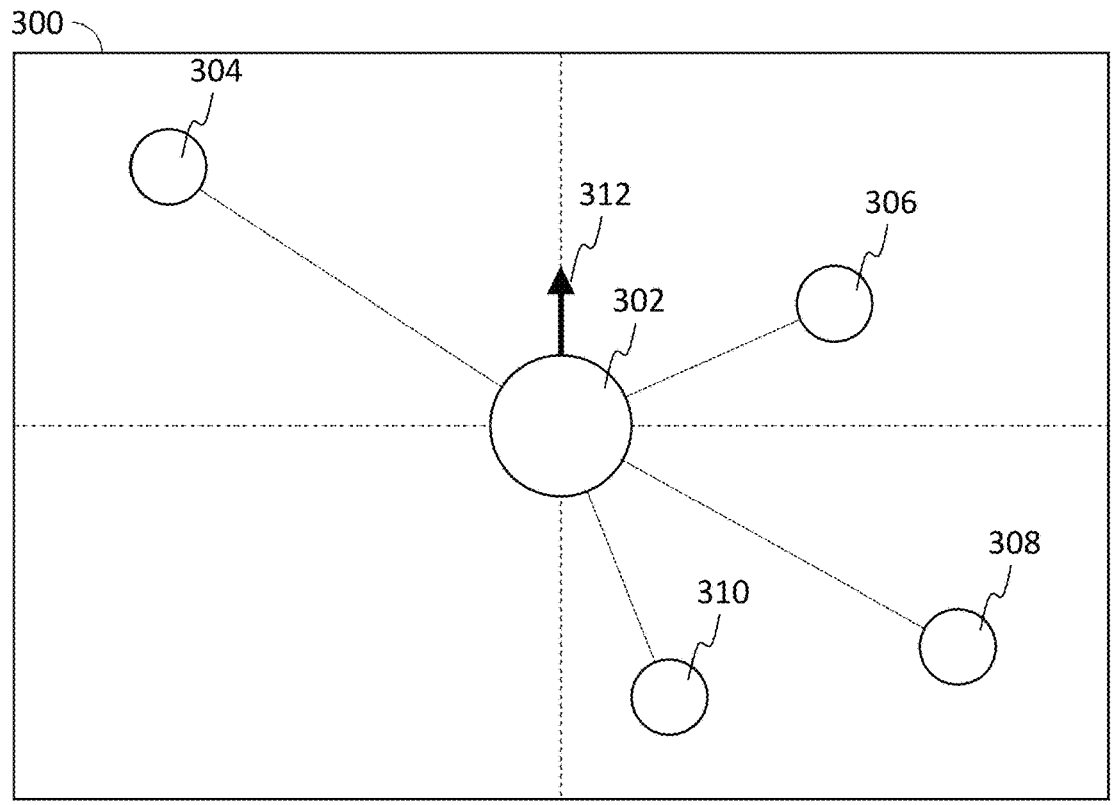
FIG. 3 shows an example of a reference layout and selection of a sound object for enhancement based on user orientation, in accordance with some embodiments of the disclosure.
Figure 3:
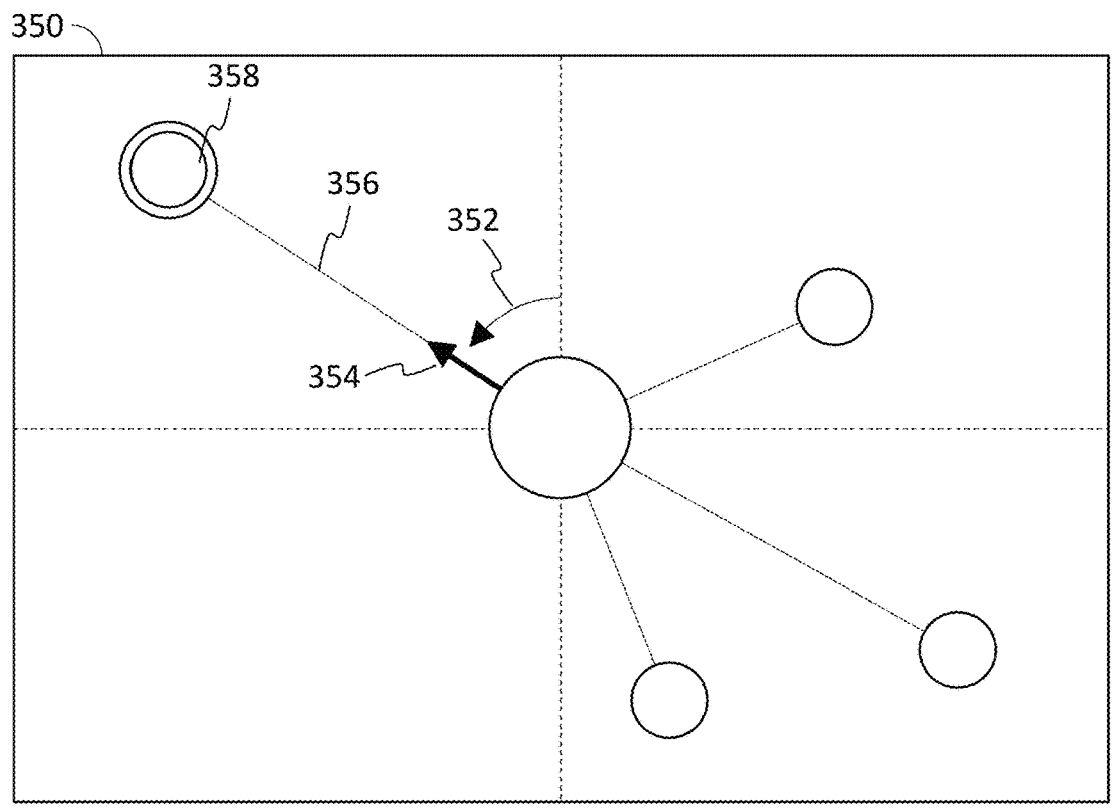

FIG. 3 shows an example of a reference layout and selection of a sound object for enhancement based on user orientation, in accordance with some embodiments of the disclosure. Although the location metadata contains three spatial coordinates for each sound object and the reference layout is constructed to account for three spatial dimensions (as in FIG. 2, above), reference layout 300 is depicted in only two dimensions for ease of discussion. As in FIG. 2, user position 302 is placed in the center of reference layout 300. Sound objects 304, 306, 308, and 310 are placed in reference layout 300 according to each sound object's respective location metadata. Using a camera, an inertial measurement unit, an accelerometer, or any other suitable device or sensor, the user's gaze 312 can be determined. If no sound objects are located along a path defined by the user's gaze, the audio of every sound object is output without modification or enhancement.

If the user turns their gaze, or otherwise orients themselves toward a specific sound object, audio of the specific sound object is enhanced. For example, as shown in reference layout 350, the user has turned 352 their gaze 354. Path 356 is extrapolated from the new gaze direction. If path 356 is within a threshold angle, relative to the user's position, of a specific sound object, audio from that specific sound object is enhanced 358.

It is noted that, in a listening environment in which multiple users are using headphones, this effect can be differentially applied to multiple users at once. Each user has their own head orientation, and the sound objects in the AV track can be modified separately for each user.

In some embodiments, the users themselves may be considered as "sound objects," with a similar process applied. During a video presentation in which multiple users are present and using headphones, they may turn to attend to specific voices or sounds in the audio track, then turn toward another user in order to attend to that user. In this case, audio detected by the focused user is added into the audio mix and selectively enhanced for any user also oriented toward that user. This aspect provides the orientation-responsive audio enhancement of the first aspect, while allowing users to converse with each other, using the same ability to shift auditory focus among either virtual sound objects or other users that are nearby in the real world.

It is noted that this embodiment depends on the ability of the system to process the relative locations of the multiple users in the environment. Such an ability may be accomplished via Ultra Wideband (UWB) ranging and positioning, or other means.

Figure 4:
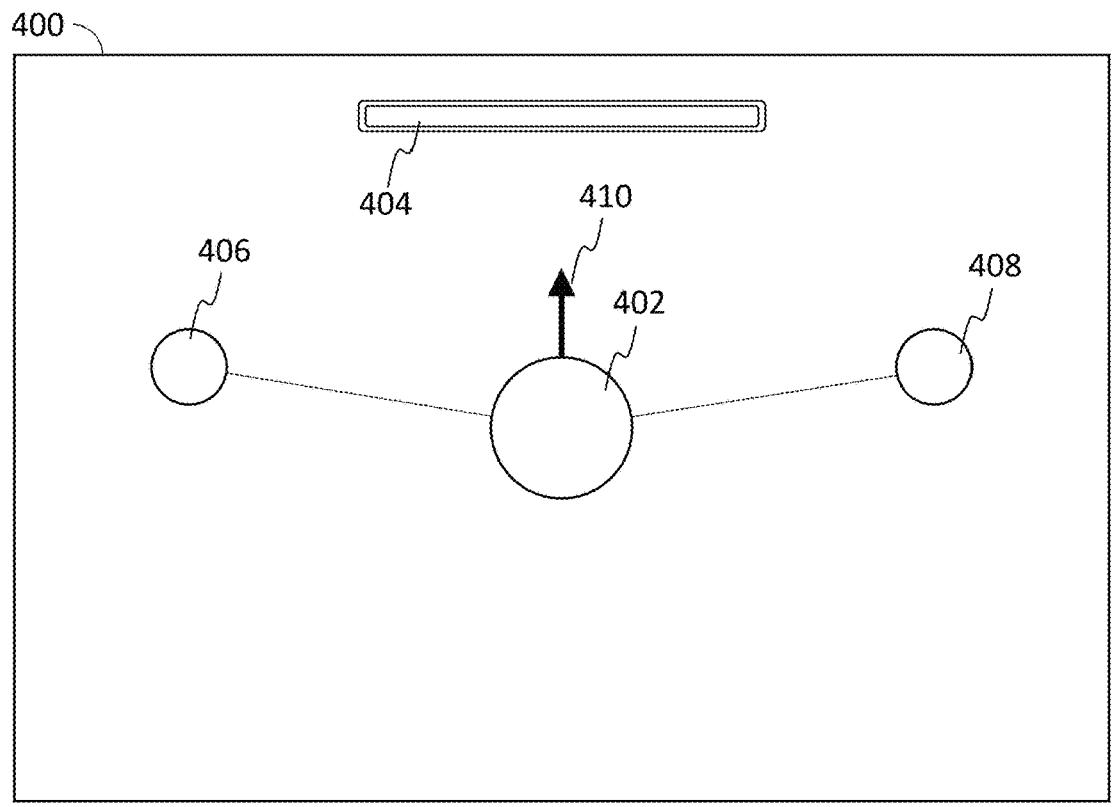
FIG. 4 shows an example of other users treated as sound objects, in accordance with some embodiments of the disclosure.
Figure 4:
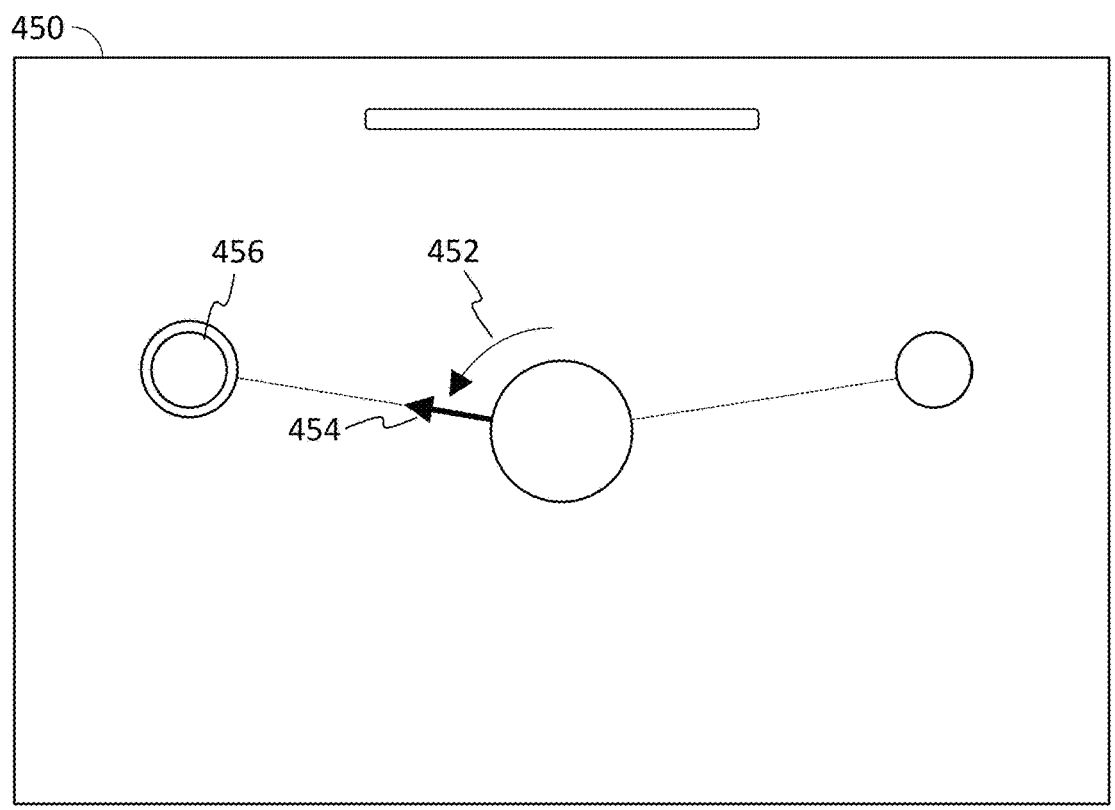

FIG. 4 shows an example of other users treated as sound objects, in accordance with some embodiments of the disclosure. Reference layout 400 includes user position 402, display position 404, and user positions 406 and 408. The user's gaze 410 is initially toward display position 404. Therefore, initially, audio of the content item is output as normal, or in an enhanced way based on the user's gaze, as described above. In some embodiments, the reference layout includes both user positions and sound object positions in a unified layout. If the user turns their gaze toward another user, sound from that user is enhanced. For example, as shown in reference layout 450, the user has turned 452 and the user's gaze 454 is in the direction of user 456. The user may have turned in response to user 456 speaking. Audio from user 456 may be captured using a microphone or a device associated with user 456. The captured audio is then played to the user as enhanced audio from a sound object.

As noted earlier, human audio perception is impacted by spatialization; in particular, humans' ability to selectively focus on a single voice in a noisy environment is enhanced when sound is spatially located, and further when there is spatial separation among sound sources (so that the sounds appear to be coming from distinct locations rather than the same point in space). Thus, some embodiments of the present disclosure adjust effective spatial separation among clustered audio effects. When multiple sound objects are at the same, or nearly the same, location, the system adjusts their virtual positioning to move them slightly apart from each other. Further, this can be done to specifically isolate voice tracks, by moving sound effects such as explosions and others away from voice. Note that as sound objects are "nudged" into new virtual locations, they may come into contact with other sound objects, meaning that those other sound objects may have to have their positions adjusted. Thus, there may be a repeated process as the "best" locations for sound objects are determined. A number of algorithms could be employed to arrive at such best positioning (including force-directed layout, simulated thermal annealing, and others).

At a high level, this process identifies sound objects with a similar angular alignment (as determined by the adjustment window) and attempts to move them to new locations by adjusting their positions by the adjustment factor. If any object is moved, it may be newly brought into overlap with some existing sound object, so the process repeats, decreasing both the window and the factor to attempt to create a new layout by using a smaller nudge. The process repeats until no sound objects have been moved, or the factor is decreased to zero, in which case overlaps may still exists but cannot be nudged further without moving the sound objects too far from their natural positions.

Figure 5:
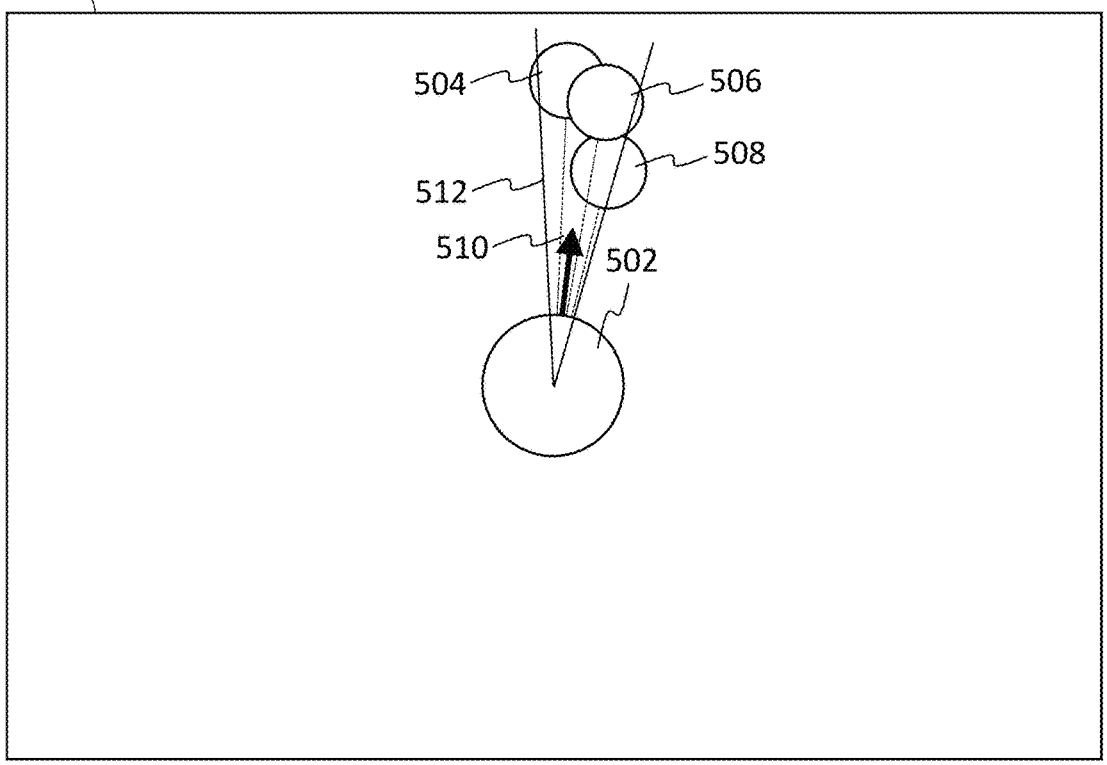
FIG. 5 shows an example of dynamic spatial separation of sound objects, in accordance with some embodiments of the disclosure.
Figure 5:
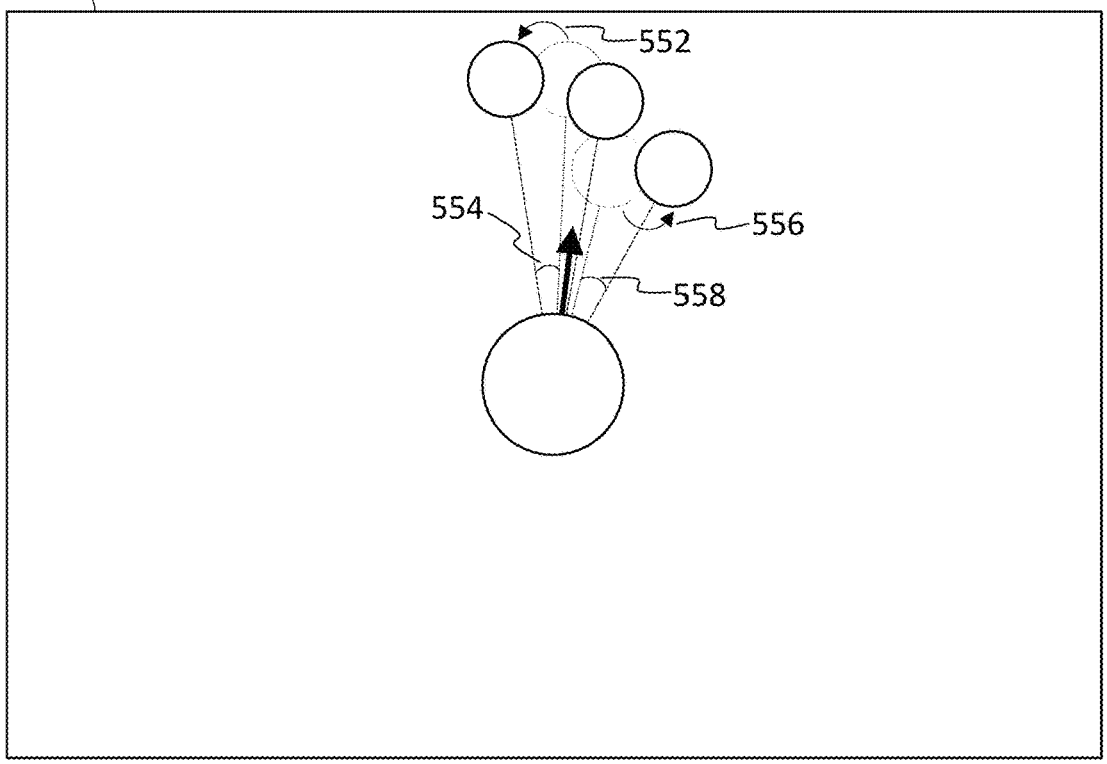

FIG. 5 shows an example of dynamic spatial separation of sound objects, in accordance with some embodiments of the disclosure. Reference layout 500 shows user position 502 and three sound objects 504, 506, 508 in close proximity to each other. If this cluster of sound objects are all within a threshold angle, relative to the user's position, of a path defined by the user's gaze 510, the sound objects can be dynamically separated. For example, the user's gaze may define a path in a given direction from the user's position through the content item. A threshold angle may be set to encompass all sound objects that fall within an area of the content item that fills within a portion of the user's visual field corresponding to the threshold angle. For example, the threshold angle may be set at five degrees. Angular slice 512 of the user's visual field, centered on the path defined by the user's gaze, is used to identify sound objects that require separation. At least part of sound objects 504, 506, and 508 may all fall within slice 512.

Upon determining that sound objects 504, 506, and 508 fall within angular slice 512 of the user's visual field, the virtual positions of one or more of sound objects 504, 506, and 508 may be adjusted. The amount of adjustment corresponds to an adjustment angle. For example, the adjustment angle may be two degrees. The adjustment angle may also be a dynamic value that changes based on the distance between the user and the virtual position of the sound object to be moved. For example, if the sound object to be moved is close to the user position, a larger angular distance may be needed to move the sound object by a sufficient linear distance than a sound object that is farther from the user position. In the example of FIG. 5, sound object 506 is closest to the path defined by the user's gaze. Accordingly, as shown in reference layout 550, sound object 506 is not moved. The virtual position of sound object 504 is adjusted 552 by an adjustment angle 554. The virtual position of sound object 506 is adjusted 556 by an adjustment angle 558. Adjustment angles 556 and 558 may be the same or different, as discussed above.

Frequency spreading can also be employed to enhance intelligibility of audio. Many people have experienced the situation where a high-pitched sound is heard, and changes in head position are used to try to determine where the sound is coming from. This happens because such a high-pitched sound has a very narrow frequency spectrum, which means that it is difficult to localize. In contrast, wide band sound contains elements at a range of frequencies, which are easier for humans to localize. By reorienting our heads we essentially are taking measurements of how the frequencies in that sound are modified by our ear shape at different orientations, giving us different auditory perspectives on that sound and improving our localization ability.

This aspect of the invention applies this notion of broadband sound being easier to localize—and hence, easier to separate from other background sounds—by using dynamic frequency spreading to enhance localization performance. Sounds with a narrow spectrum are processed in order to create frequency components above and below the central frequency point, effectively "spreading" the sound over a broader frequency spectrum. The result is a sound that is perceptually similar to the original but yields better human localization performance.

Sounds with a limited frequency spectrum are identified by applying a pre-defined cutoff—for example, sounds that have a frequency range within 200 Hz. Such sounds would be candidates for frequency spreading. When such sounds are identified, the mean frequency for the sound, which represents the "center" of the frequency spectrum for the sound, is computed. Then, for each frequency component both above and beyond this center, a scaling factor is applied in order to spread the sound frequencies more broadly around this center.

Higher scaling factors should yield better localization performance, yet may result in sounds that are perceptibly different from the original. Thus, one variant on this process may be to choose a scaling factor based on the frequency spectrum of the original sound. An original sound that is close to the cutoff threshold may need less processing (a lower scaling factor) than an original sound that is extremely narrow (and which thus requires a larger scaling factor).

Figure 6:
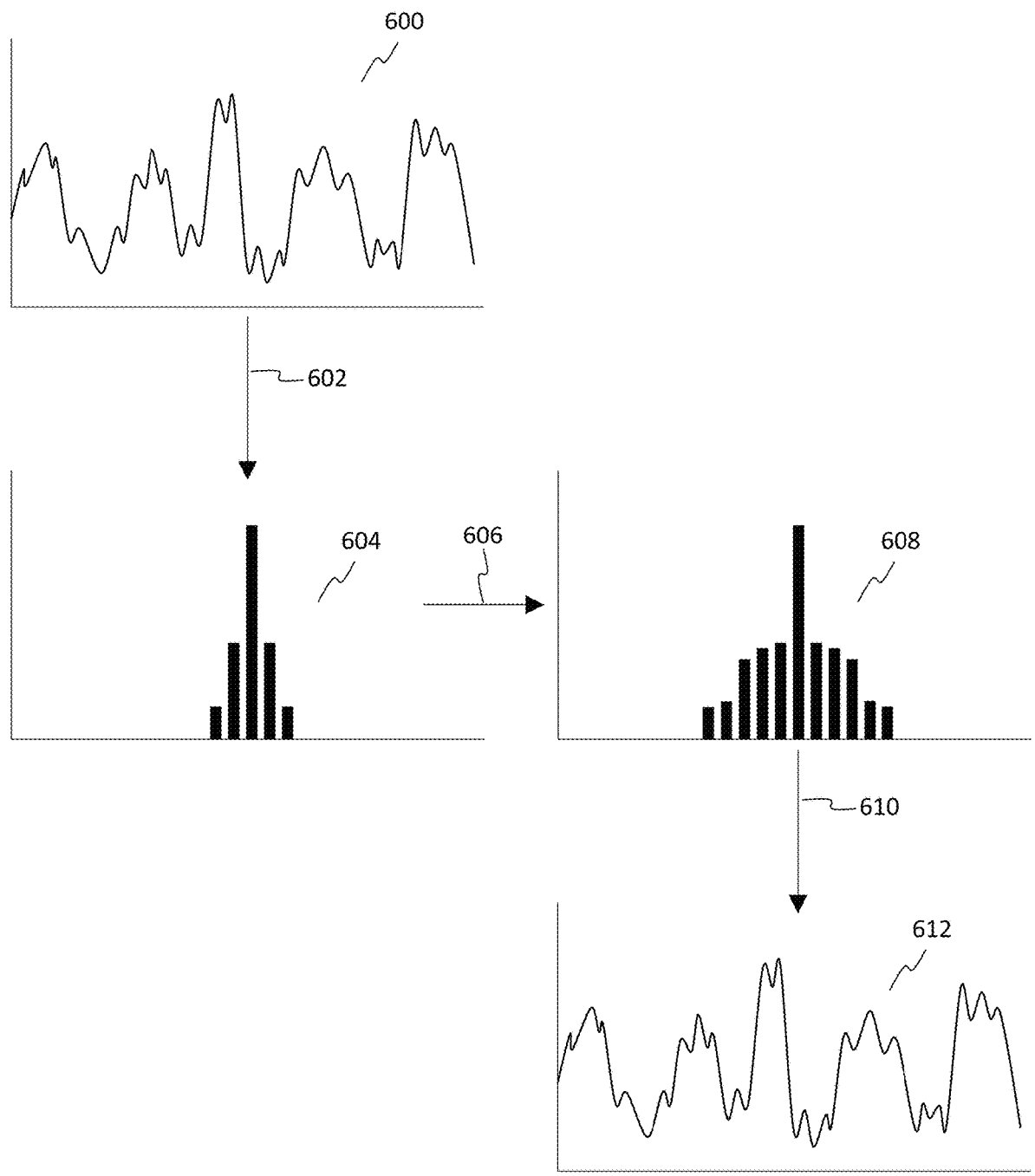
FIG. 6 shows an example of frequency spreading of a sound, in accordance with some embodiments of the disclosure.

FIG. 6 shows an example of frequency spreading of a sound, in accordance with some embodiments of the disclosure. Spectrograph 600 is a time-domain representation of an audio signal of a sound object. The audio signal is converted 602 to a frequency-domain signal 604 to identify the various frequency components that comprise the audio signal. This may be accomplished using a Fourier transform operation. Once each frequency component has been identified, a frequency bandwidth of the audio signal can be calculated. For example, a difference in frequency between the highest and lowest frequency components can be calculated. If the difference, or bandwidth, is calculated to be below a threshold bandwidth (e.g., 200 Hz), then a frequency spreading operation can be performed (606). For example, the mean frequency component can be identified. Each frequency component below the mean frequency component can be multiplied by a first scaling factor. Similarly, each frequency component above the mean frequency component can be multiplied by a second scaling factor. In some embodiments, the first scaling factor is a negative scaling factor and the second scaling factor is a positive scaling factor. In other embodiments, the first scaling factor may be a value between zero and one and the second scaling factor may be a value greater than one. The resulting frequency-domain signal 608 is composed of a wider range of frequencies compared to the original sound. The frequency-domain signal is then converted 610 back to a time-domain signal 612 to generate a new audio for the sound object.

In some embodiments, a user may be consuming the content item on a device that is capable of displaying text or graphics overlaid on the content. For example, a device enabled for augmented reality (AR) or virtual reality (VR) may present a user with additional information or content relating to one or more portions of the content item. If multiple sound objects are located along a path defined by a user's gaze, additional information for each sound object and/or representations of each sound object can be generated for display. The user can then select which object's audio is to be enhanced by turning their gaze toward one set of information, additional content, or representation being displayed.

Figure 7:
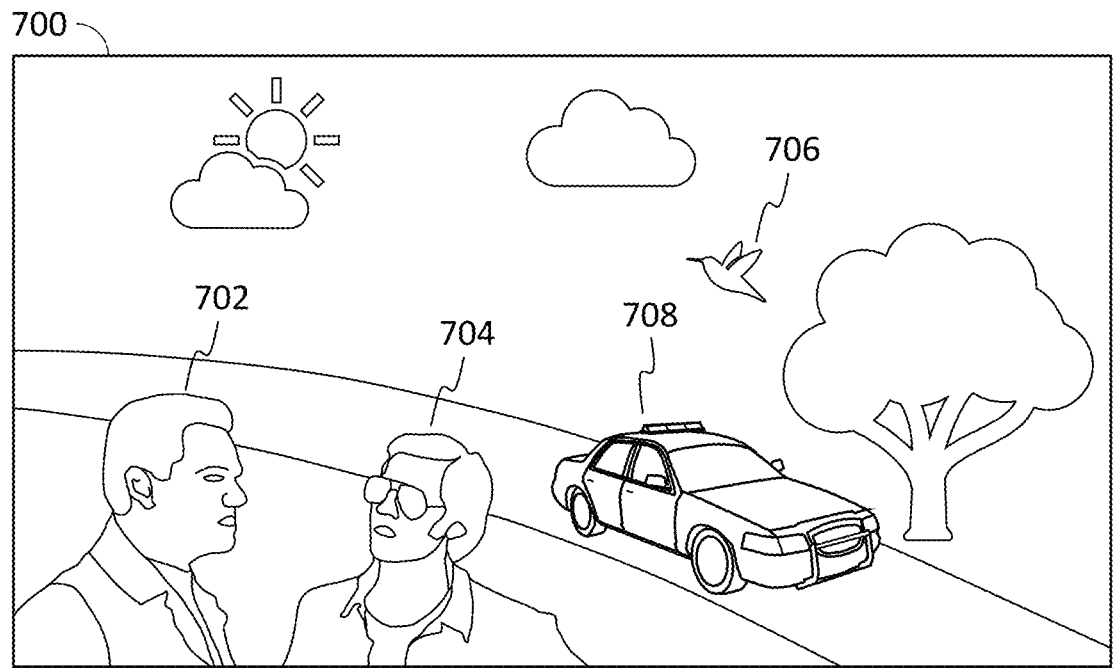
FIG. 7 shows an example of a display of representations of sound objects in a content item, in accordance with some embodiments of the disclosure.
Figure 7:
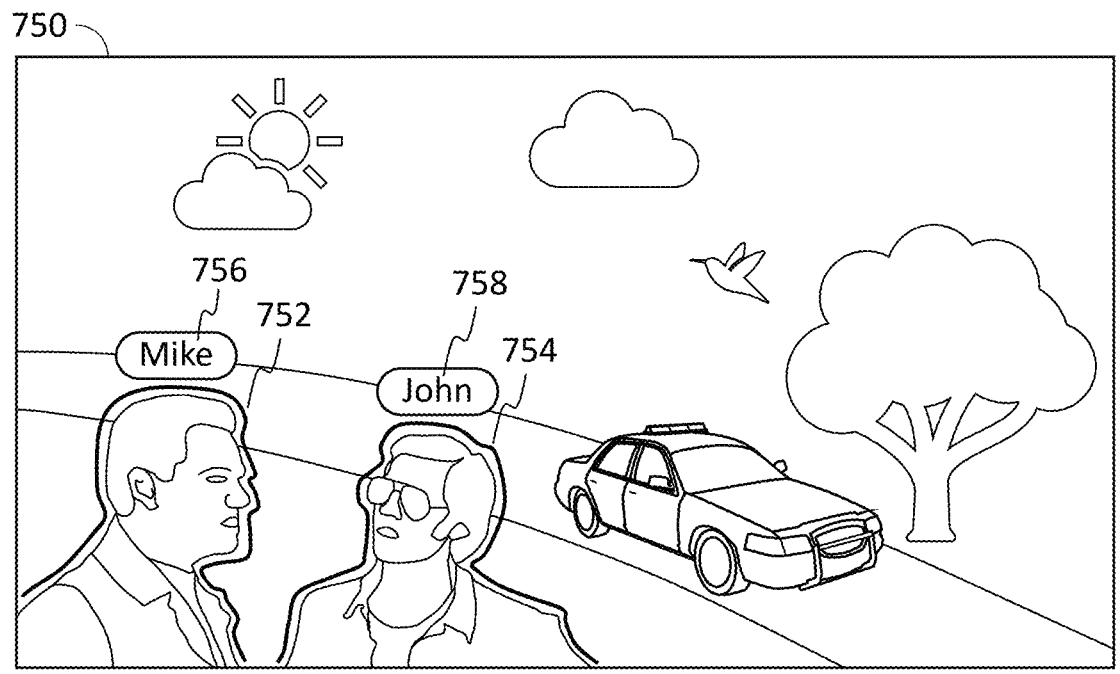

FIG. 7 shows an example of a display of representations of sound objects in a content item, in accordance with some embodiments of the disclosure. As shown in view 700, a content item contains sound objects 702, 704, 706, and 708. If sound objects 702 and 704 are along a path defined by the user's gaze, or are within a threshold angle of the path, additional representations and/or information about each sound object are overlaid on the content item. For example, as shown in view 750 of the content item, an outline or other highlight 752 is displayed. A similar outline or highlight 754 is displayed for sound object 704. Additional information 756 and 758 may also be displayed.

Figure 8:
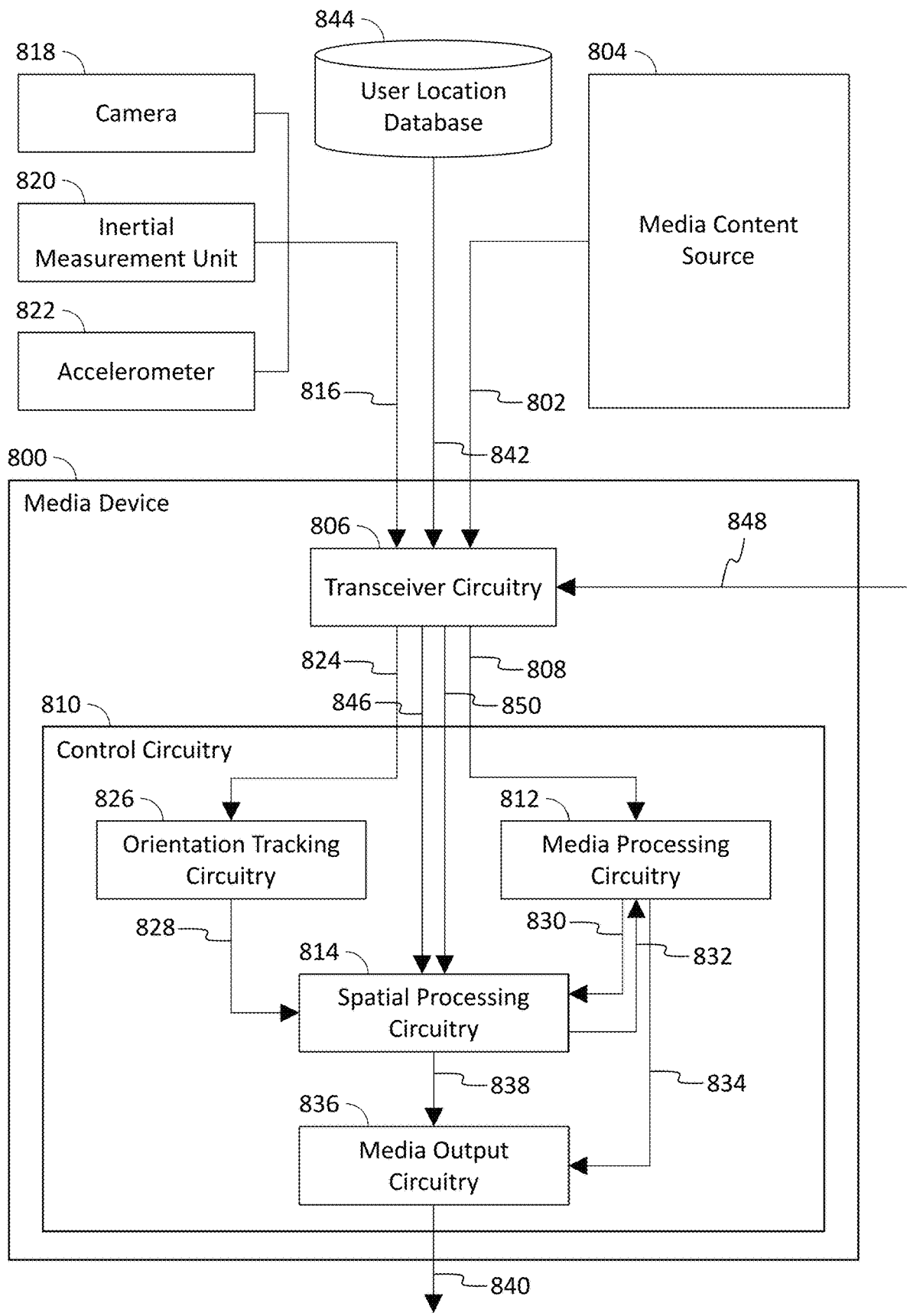
FIG. 8 is a block diagram showing components and data flow therebetween of a system for enhancing audio of a sound object, in accordance with some embodiments of the disclosure.

FIG. 8 is a block diagram showing components and data flow therebetween of a system for enhancing audio of a sound object, in accordance with some embodiments of the disclosure. Media device 800 receives 802 media content from media content source 804. Media content source 804 may be a local storage device integrated with media device 800 or may be a storage device or streaming media server located remotely from media device 800. Media device 800 receives the media content using transceiver circuitry 806. Transceiver circuitry 806 comprises a network connection over which data can be transmitted to and received from remote devices, such as an ethernet connection, WiFi connection, mobile broadband interface, or connection employing any other suitable networking protocol. Transceiver circuitry 806 may also comprise a data transmission bus through which media device 800 accesses local storage devices, memory, or file servers.

Transceiver circuitry 806 in turn transmits 808 the media content to control circuitry 810. Control circuitry 810 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 810 receives the media content at media processing circuitry 812. Media processing circuitry 812 processes the media content to extract video and audio data and generate video and audio signals for output. Media processing circuitry 812 also extracts metadata from the media content. The metadata includes location data for each sound object in the media content for each frame of the media content. The location data may be used by surround sound systems to locate sound corresponding to each sound object without a physical space in which the surround sound system is installed, and output the sounds using the correct output devices to simulate the presence of the sound object at the identified location. This may be accomplished using spatial processing circuitry 814.

When multiple sounds are played concurrently, it can be difficult for a user to understand or process them simultaneously and a user may user natural motions. For example, the user may tilt their head or turn their ear toward the source of the sound, to try and better hear the sound. The user's gaze may shift from being generally centered on the display of the media content to being focused on a specific sound object within the media content.

Spatial processing circuitry 814 generates a reference layout of sound objects in a virtual space based on the location metadata. For example, the user's position is set as the origin (i.e., coordinates (0,0) in a two-dimensional reference layout or coordinates (0,0,0) in a three-dimensional reference layout), and each sound object is placed in a position around the user according to its location metadata. As will be discussed below, some modification of sound object positions relative to the user position may be made based on the user's position relative to a display of the media content.

Media device 800 receives 816 user position information from one or more sensors, such as camera 818, inertial measurement unit 820, and accelerometer 822. Camera 818 may be external to, or integrated with, media device 800. Inertial measurement unit 820 and accelerometer 822 may be integrated with media device 800, or with a device worn by, or in the possession of, the user, such as a smartphone, smartwatch, headphones, headset, or other device. The position information is received at transceiver circuitry 806, which in turn transmits 824 the position information to orientation tracking circuitry 826. Orientation tracking circuitry 826 determines where the user's gaze or attention is focused. For example, using camera 818, orientation tracking circuitry may determine the direction of the user's gaze using facial recognition, pupil tracking, or other techniques. Orientation tracking circuitry may use data from inertial measurement unit 820 and/or accelerometer 822 to determine a position and/or pose of the user's head.

Orientation tracking circuitry 826 transmits 828 information relating to the user's gaze direction and/or orientation to spatial processing circuitry 814. Media processing circuitry 812 also transmits 830 the location information extracted from metadata of the content item to spatial processing circuitry 814. Spatial processing circuitry 814 determines a path along which the user is focused. This may be a gaze path based on the direction the user is gazing or may be a path from the user's ear toward a sound source. Spatial processing circuitry 814 projects the path through the reference layout. Depending on the user's position relative to a display of the content item, spatial processing circuitry 814 may modify the path, or may modify the positions of sound objects in the reference layout. For example, the gaze of a user seated to the left of a display screen will start toward the user's right in order to focus on the center of the display. In contrast, a user seated directly in front of the display will have a forward gaze when focused on the center of the display. Thus, the angle at which a user focuses on the display must be corrected, and the gaze line shifted, to account for the user's position relative to the display.

Spatial processing circuitry 814 determines, based on the location information and the gaze line, which sound objects intersect the gaze line or are within a threshold angle, relative to the user's position, of the gaze line. For example, spatial processing circuitry 814 determines whether the gaze line passes through coordinates occupied by a sound object. Spatial processing circuitry 814 may generate secondary bounding lines that diverge from the gaze line by a threshold angle, such as five degrees, in any direction. Spatial processing circuitry 814 then determines whether any sound object falls within a two-dimensional slice or three-dimensional sector of the content item defined by the secondary bounding lines.

If one sound object is located along the gaze path, spatial processing circuitry 814 transmits 832 an instruction to media processing circuitry 812 to enhance audio of the sound object. In response to the instruction, media processing circuitry 812 performs the requested audio enhancement. For example, while processing the audio of the media content for output, media processing circuitry 812 may raise the volume of audio of the sound object. Alternatively or additionally, media processing circuitry 812 may reduce volume of other sound objects in the media content. Media processing circuitry 812 then transmits 834 the video signal and enhanced audio signal to media output circuitry 836. Media output circuitry 836 may be a display driver and/or speaker driver. In some embodiments, media output circuitry 836 may receive 838 instructions from spatial processing circuitry 814 to modify the output of audio to one or more channels of a surround sound system. Media output circuitry 836 then outputs 840 the video and enhanced audio to the user.

In some embodiments, other users present in physical proximity to the user may also be considered sound objects. Media device 800 may receive 842, using transceiver circuitry 806, location data for each user from user location database 844. User location database 844 may be managed by a mobile network operator, internet service provider, or other third party. Alternatively, user location database 844 may be local to media device 800 and may be populated with location data for each user through user location detection methods such as Ultra-Wideband ranging and positioning, GPS signals, etc. Transceiver circuitry 806 transmits 846 the location data to spatial processing circuitry 814, where it is combined with the location metadata extracted from the content item. When the user focuses on one of the other users present, audio captured from that user is enhanced, rather than audio from within the content item.

If more than one sound object is located along the gaze path, or within the slice or sector defined by the secondary bounding lines, spatial processing circuitry 814 repositions one or more sound objects to improve intelligibility of audio of a single sound object. If two sound objects are along the gaze path, spatial processing circuitry 814 may determine which of the two sound objects the user is trying to focus on. For example, one sound object may contain a voice track and the other sound object contains a noise, such as a car horn, siren, or other background noise. Spatial processing circuitry 814, upon identifying the sound object being focused on, may adjust the virtual position of the other sound object by a linear distance corresponding to an adjustment angle. For example, the adjustment angle may be two degrees. The virtual position of the sound object is thus adjusted by a linear distance corresponding to an angular distance of two degrees from the gaze path and the distance from the plane of display of the content. If three or more sound objects are along the gaze path, those on which the user is determined not to be focused are moved away from the sound object of focus and from each other.

After adjusting the virtual position of a sound object, the threshold angle that defines the secondary boundary lines is reduced. The adjustment angle by which virtual positions of sound objects are adjusted is also reduced. The process above is then repeated iteratively until no further adjustments are necessary (i.e., no sound objects are too close to each other) or the adjustment angle or threshold angle reaches a minimum value.

In some embodiments, when multiple sound objects are along the gaze path, representations of each sound object may be generated for display. The user can then select which of the represented sound objects should have its audio enhanced. Media device 800 may receive 848, using transceiver circuitry 806, an input from the user selecting a sound object. Transceiver circuitry 806 transmits 850 the selection to spatial processing circuitry 814. Spatial processing circuitry 814 then instructs media processing circuitry 812 or media output circuitry 836 as discussed above.

In some embodiments, media processing circuitry 812 determines a frequency bandwidth of audio of one or more sound objects. For example, media processing circuitry 812 may determine a frequency bandwidth of audio of the selected sound object on which the user is focused. Alternatively, media processing circuitry 812 may process audio from every sound object in the media content. If the frequency bandwidth of audio of a sound object is below a threshold frequency (e.g., 200 Hz), media processing circuitry 812 performs a frequency spreading operation. Media processing circuitry 812 converts the audio from a time-domain signal to a frequency-domain signal. This may be accomplished using a Fourier transform operation. Media processing circuitry 812 can thus identify each frequency component of the audio signal. Media processing circuitry 812 determines a mean frequency of the signal. Each frequency component below the mean frequency is multiplied by a first scaling factor (e.g., a value between zero and one) to generate additional frequency components below the mean frequency. Similarly, each frequency component above the mean frequency is multiplied by a second scaling factor (e.g., a value greater than one) to generate additional frequency components above the mean frequency. The resulting frequency-domain signal is then converted back to a time-domain signal to generate a new audio signal. Media processing circuitry 812 then transmits 834 the new audio signal for the sound object to media output circuitry 836 in place of the original audio signal for that sound object.

Figure 9:
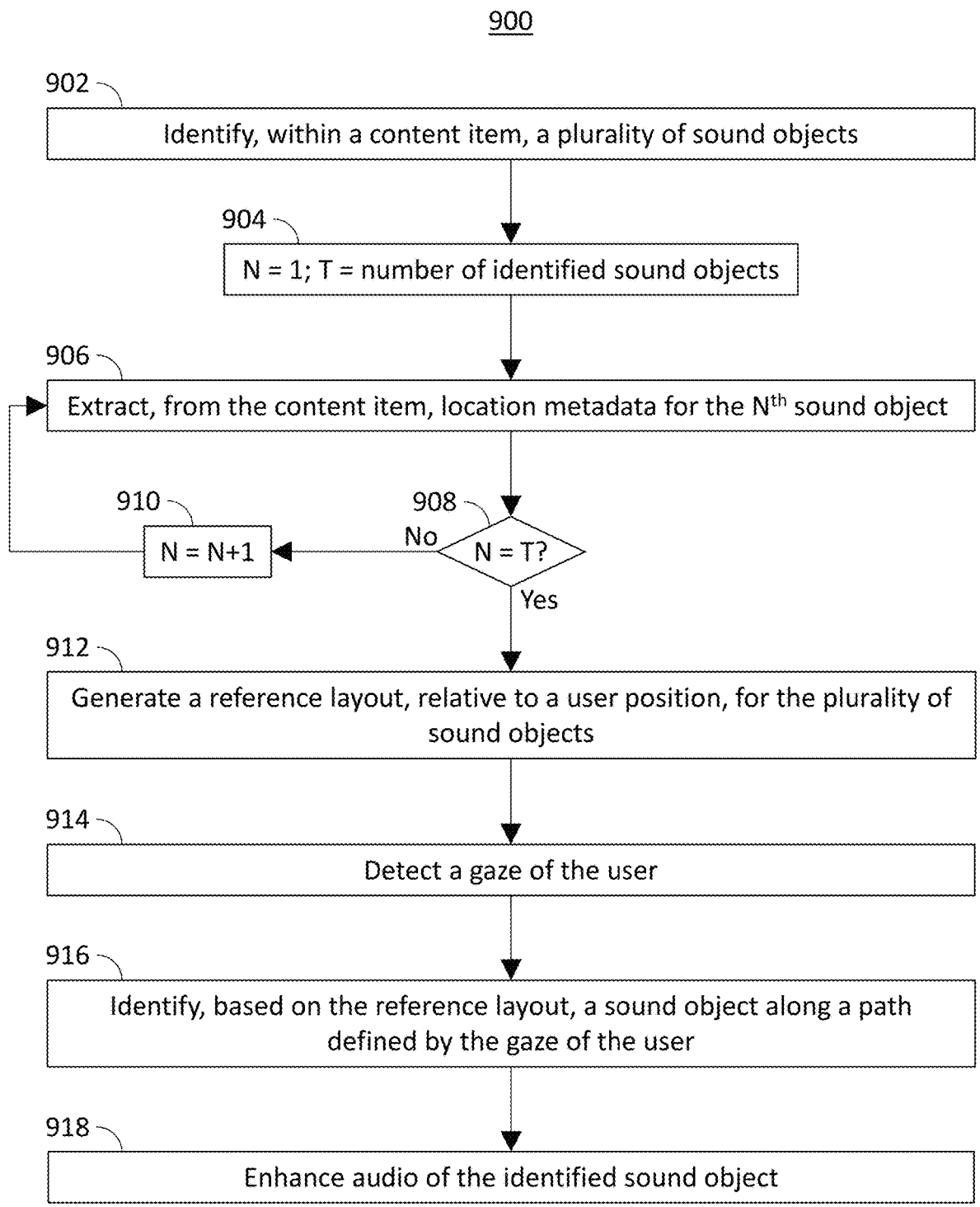
FIG. 9 is a flowchart representing an illustrative process for orientation-based audio enhancement, in accordance with some embodiments of the disclosure.

FIG. 9 is a flowchart representing an illustrative process 900 for enhancing audio of a first sound object containing a voice where more than one sound object is located along a path defined by the orientation of a user, in accordance with some embodiments of the disclosure. Process 900 may be implemented on control circuitry 810. In addition, one or more actions of process 900 may be incorporated into or combined with one or more actions of any other process or embodiment described herein.

At 902, control circuitry 810 identifies, within a content item, a plurality of sound objects. For example, control circuitry 810 may extract, from the content item, metadata describing the plurality of sound objects. Alternatively, control circuitry 810 may analyze audio and/or video data of the content item to identify objects emitting sound, including sounds from sources that are not depicted in the video data.

At 904, control circuitry 810 initializes a counter variable N, setting its value to one, and a variable T representing the number of identified sound objects. At 906, control circuitry 810 extracts, from the content item, location metadata for the $N^{th}$ sound object. For example, the content item may include metadata for each of the plurality of sound objects. The $N^{th}$ sound object may have a corresponding identifier used to extract metadata specific to the $N^{th}$ sound object. At 908, control circuitry 810 determines whether N is equal to T, meaning that location metadata for all identified sound objects has been extracted from the content item. If N is not equal to T ("No" at 908), then, at 910, control circuitry 810 increments the value of N by one, and processing returns to 906.

If N is equal to T ("Yes" at 908), then, at 912, control circuitry 810 generates a reference layout, relative to a user position, for the plurality of sound objects. For example, control circuitry 810 may generate a two-dimensional or three-dimensional virtual space in which each sound object is placed according to its location metadata. The user is placed in a position within the virtual space from which positions of all sound objects are calculated. For example, in a two-dimensional reference layout, the user may be placed at coordinates (0,0).

At 914, control circuitry 810 detects a gaze of the user. Control circuitry 810 may receive position and/or orientation data of the user from a variety of sensors or sources, such as cameras, inertial measurement devices, and accelerometers. This information is used to determine where the user is looking. At 916, control circuitry 810 identifies, based on the reference layout, a sound object along a path defined by the gaze of the user. Control circuitry 810 generates a path based on the direct of the user's gaze. The path may be superimposed on the reference layout. Control circuitry 810 compares the position of sound objects with the gaze path to determine if a specific sound object falls along the path.

At 918, control circuitry 810 enhances audio of the identified sound object. If a sound object is identified along the path of the user's gaze, audio of that sound object is enhanced. Control circuitry 810 may increase the volume of audio of the sound object. Alternatively or additionally, control circuitry 810 may reduce volume of other sound objects. Other types of enhancements may be performed, including dynamic spatial separation of clustered sound objects and frequency spreading of narrow-band sounds. These are discussed further below.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
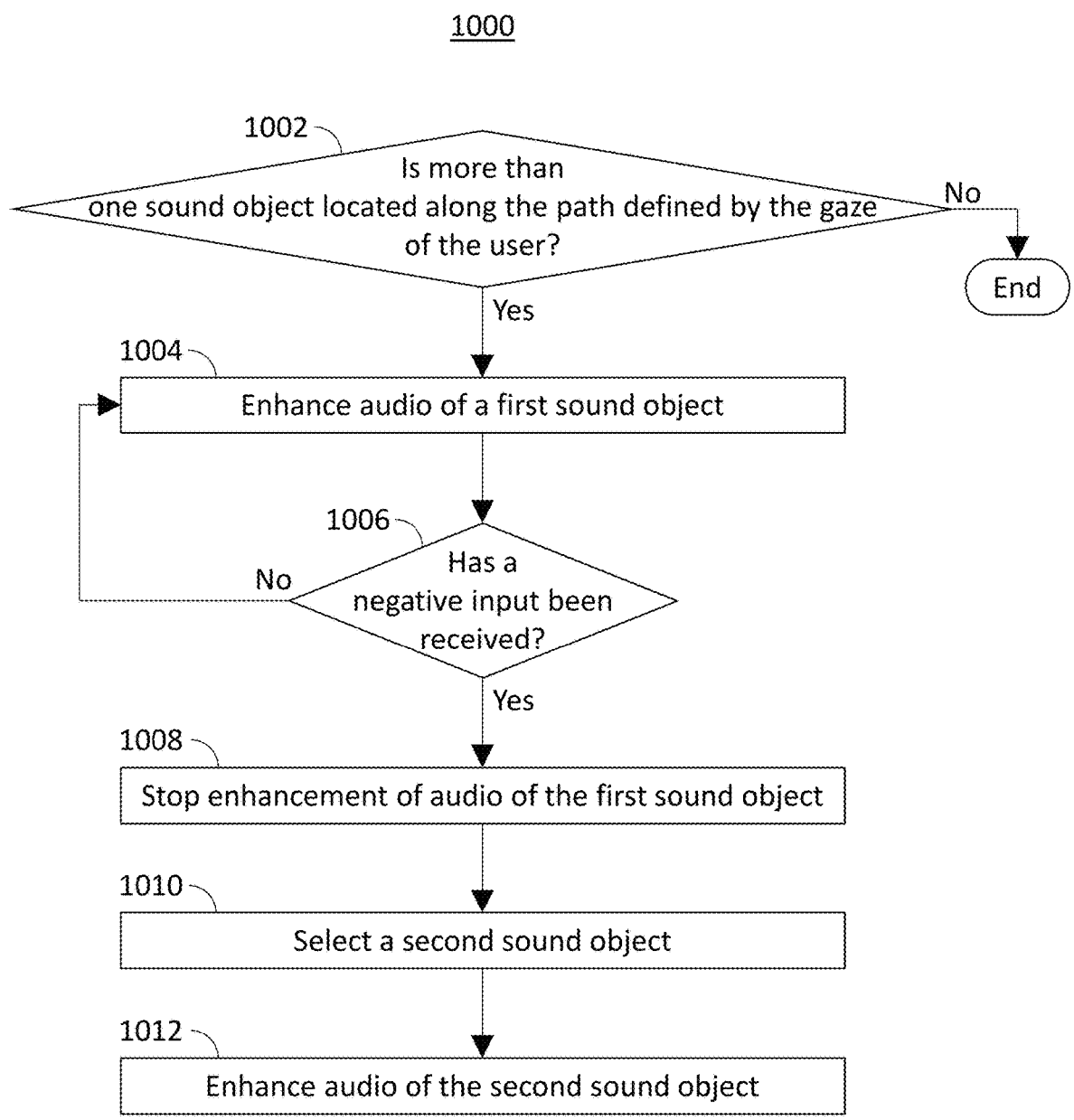
FIG. 10 is a flowchart representing an illustrative process for enhancing audio of a first sound object where more than one sound object is located along a path defined by the orientation of a user, in accordance with some embodiments of the disclosure.

FIG. 10 is a flowchart representing an illustrative process 1000 for enhancing audio of a first sound object where more than one sound object is located along a path defined by the orientation of a user, in accordance with some embodiments of the disclosure. Process 1000 may be implemented on control circuitry 810. In addition, one or more actions of process 1000 may be incorporated into or combined with one or more actions of any other process or embodiment described herein.

At 1002, control circuitry 810 determines whether more than one sound object is located along the path defined by the gaze of the user. Control circuitry 810 may compare the gaze path with the location metadata and/or the reference layout and identify each sound object that is along the gaze path. In some embodiments, sound objects are considered to be along the gaze path if they fall within a linear distance corresponding to a threshold angle, relative to the user position, from the gaze path.

If more than one sound object is located along the gaze path ("Yes" at 1002), then, at 1004, control circuitry 810 enhances audio of a first sound object that is along the gaze path. At 1006, control circuitry 810 determines whether a negative input has been received. Control circuitry 810 may receive negative inputs from the user from a physical input device, such as a keyboard or touchscreen, or may capture gestures or speech of the user. For example, the user may shake their head to indicate a negative response to enhancement of a sound object. If a negative input has not been received ("No" at 1006), then control circuitry 810 continues to enhance audio of the first sound object until the end of audio of the first sound object.

If a negative input has been received ("Yes" at 1006), then, at 1008, control circuitry 810 stops enhancement of audio of the first sound object. At 1010, control circuitry 810 selects a second sound object for enhancement. Then, at 1012, control circuitry 810 enhances audio of the second sound object.

In some embodiments, control circuitry 810 may first analyze the audio of all the sound objects along the path and rank them in order of likelihood of being the target of the user's focus. For example, audio of one sound object may contain a voice. Control circuitry 810 may determine that the user is most likely to be focusing on the voice and rank that sound object highest. When determining candidate sound objects for enhancement, control circuitry 810 may rank each sound object in order of likelihood of being the target of the user's focus. If a negative input is received for a sound object having a first rank, control circuitry 810 selects the sound object having the next highest rank, moving down in rank until no negative inputs are received.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
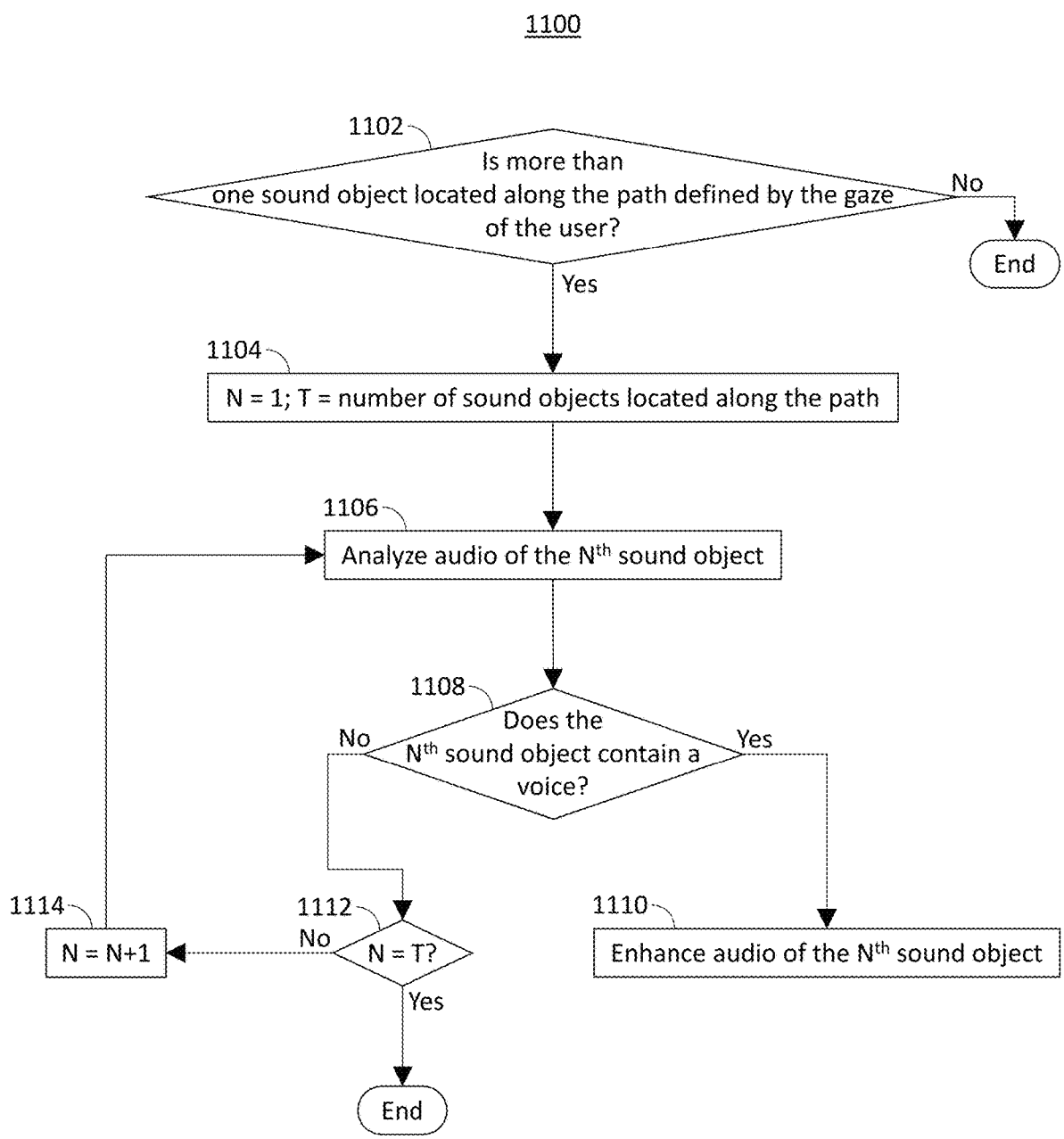
FIG. 11 is a flowchart representing an illustrative process for enhancing audio of a first sound object containing a voice where more than one sound object is located along a path defined by the orientation of a user, in accordance with some embodiments of the disclosure.

FIG. 11 is a flowchart representing an illustrative process 1100 for enhancing audio of a first sound object containing a voice where more than one sound object is located along a path defined by the orientation of a user, in accordance with some embodiments of the disclosure. Process 1100 may be implemented on control circuitry 810. In addition, one or more actions of process 1100 may be incorporated into or combined with one or more actions of any other process or embodiment described herein.

At 1102, control circuitry 810 determines whether more than one sound object is located along the path defined by the gaze of the user. Control circuitry 810 may compare the gaze path with the location metadata and/or the reference layout and identify each sound object that is along the gaze path. In some embodiments, sound objects are considered to be along the gaze path if they fall within a linear distance corresponding to a threshold angle, relative to the user position, from the gaze path.

If more than one sound object is located along the path defined by the gaze of the user ("Yes" at 1102), then, at 1104, control circuitry 810 initializes a counter variable N, setting its value to one, and a variable T representing the number of sound objects located along the path. At 1106, control circuitry 810 analyzes audio of the $N^{th}$ sound object and determines its audio characteristics. At 1108, control circuitry 810 determines, based on the audio characteristics, whether the $N^{th}$ sound object contains a voice. If the $N^{th}$ sound object contains a voice ("Yes" at 1108), then, at 1110, control circuitry 810 enhances audio of the $N^{th}$ sound object. If the $N^{th}$ sound object does not contain a voice ("No" at 1108), then, at 1112, control circuitry 810 determines whether N is equal to T, meaning that audio for each of the sound objects has been analyzed. If N is not equal to T ("No" at 1112), then, at 1114, control circuitry 810 increments the value of N by one, and processing returns to 1106. If N is equal to T ("Yes" at 1112), then the process ends.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
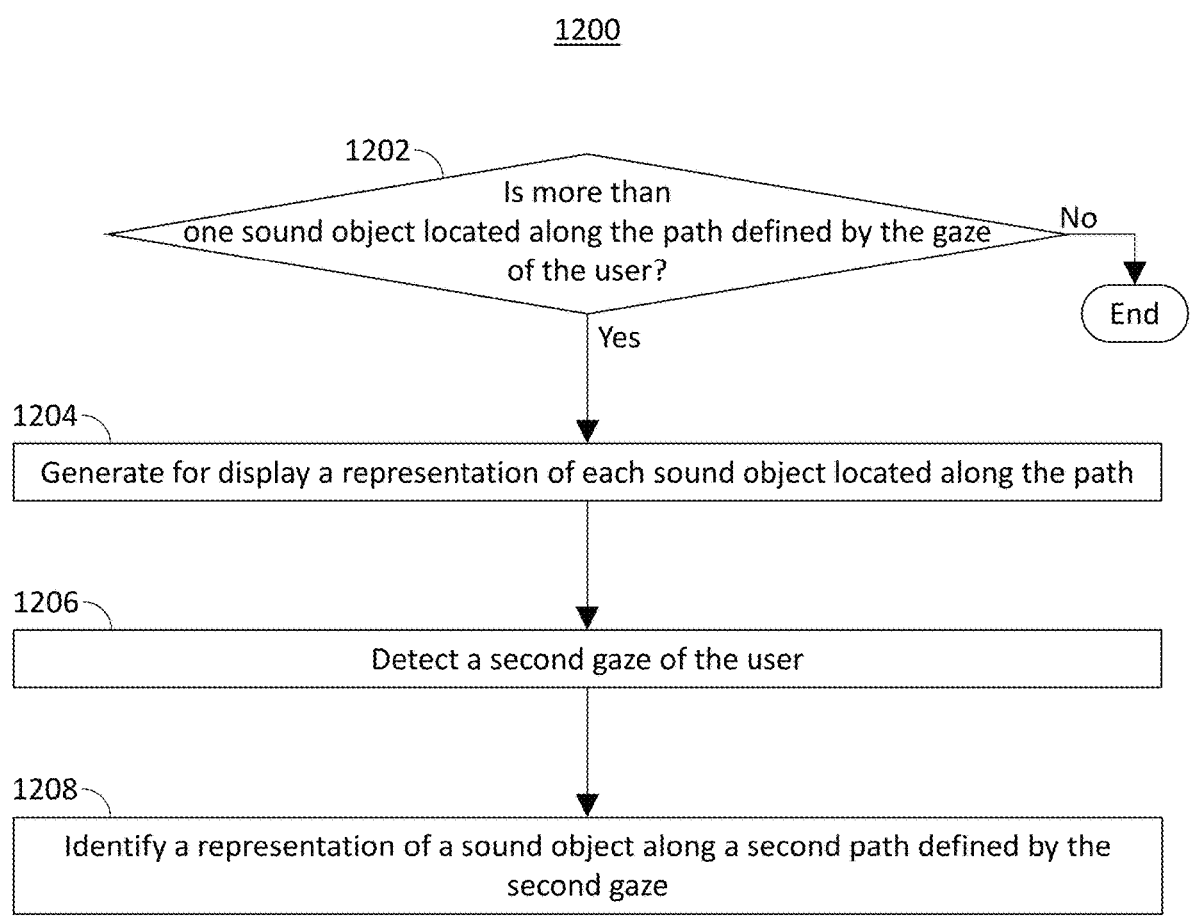
FIG. 12 is a flowchart representing an illustrative process for selecting a sound object for enhancement based on a user's orientation toward a representation of the sound object, in accordance with some embodiments of the disclosure.

FIG. 12 is a flowchart representing an illustrative process 1200 for selecting a sound object for enhancement based on a user's orientation toward a representation of the sound object, in accordance with some embodiments of the disclosure. Process 1200 may be implemented on control circuitry 810. In addition, one or more actions of process 1200 may be incorporated into or combined with one or more actions of any other process or embodiment described herein.

At 1202, control circuitry 810 determines whether more than one sound object is located along the path defined by the gaze of the user. Control circuitry 810 may compare the gaze path with the location metadata and/or the reference layout and identify each sound object that is along the gaze path. In some embodiments, sound objects are considered to be along the gaze path if they fall within a linear distance corresponding to a threshold angle, relative to the user position, from the gaze path.

If more than one sound object is located along the path defined by the gaze of the user ("Yes" at 1202), then, at 1204, control circuitry 810 generates for display a representation of each sound object located along the path. For example, control circuitry 810 may generate for display an outline or highlight of each sound object overlaid on the content item. Alternatively or additionally, identifying text may be generated for display. In some embodiments, the representations are generated for display on a second display device.

At 1206, control circuitry 810 detects a second gaze of the user. This may be accomplished using gaze detection methods described above. At 1208, control circuitry 810 identifies a representation of a sound object along a second gaze path defined by the second gaze. For example, the positions of each representation may be added to the reference layout and the second gaze path compared with those positions. As another example, the second gaze path may be used to identify a position on the display at which the user is focused. Control circuitry 810 then identifies the representation that is along, or closest to, the second gaze path.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
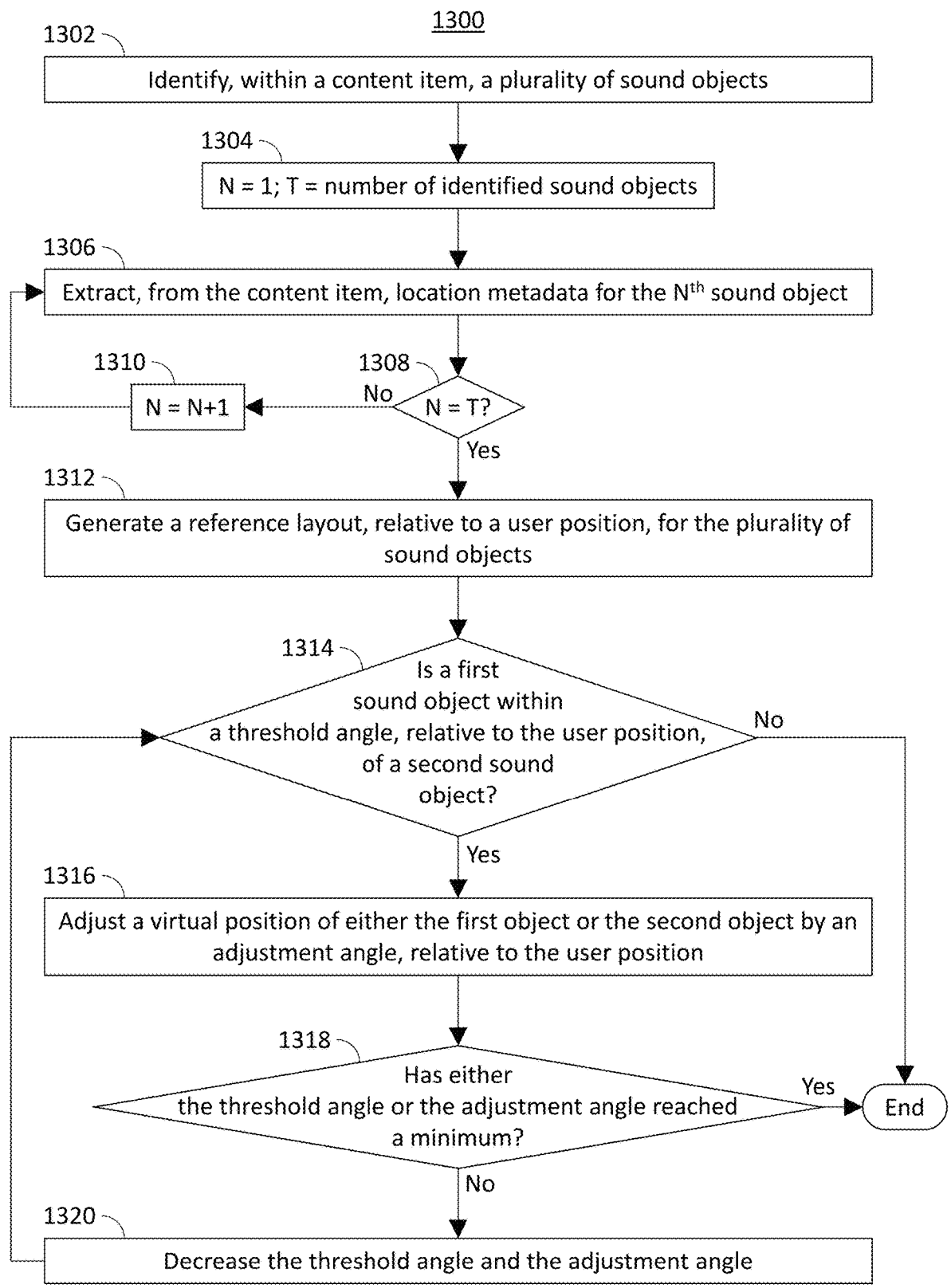
FIG. 13 is a flowchart representing an illustrative process for dynamic spatial separation of sound objects, in accordance with some embodiments of the disclosure.

FIG. 13 is a flowchart representing an illustrative process 1300 for dynamic spatial separation of sound objects, in accordance with some embodiments of the disclosure. Process 1300 may be implemented on control circuitry 810. In addition, one or more actions of process 1300 may be incorporated into or combined with one or more actions of any other process or embodiment described herein.

At 1302, control circuitry 810 identifies, within a content item, a plurality of sound objects. This may be accomplished using methods described above in connection with FIG. 9. At 1304, control circuitry 810 initializes a counter variable N, setting its value to one, and a variable T representing the number of identified sound objects. At 1306, control circuitry 810 extracts, from the content item, location metadata for the $N^{th}$ sound object. This may be accomplished using methods described above in connection with FIG. 9. At 1308, control circuitry 810 determines whether N is equal to T, meaning that location metadata has been extracted for every identified sound object. If N is not equal to T ("No" at 1308), then, at 1310, control circuitry 810 increments the value of N by one and processing returns to 1306. If N is equal to T ("Yes" at 1308), then, at 1312, control circuitry 810 generates a reference layout, relative to a user position, for the plurality of sound objects. This may be accomplished using methods described above in connection with FIG. 9.

At 1314, control circuitry 810 determines whether a first sound object is within a threshold angle, relative to the user position, of a second sound object. Control circuitry 810 may generate secondary bounding lines that diverge from the gaze line by a threshold angle, such as five degrees, in any direction. Control circuitry 810 then determines whether any sound object falls within a two-dimensional slice or three-dimensional sector of the reference layout defined by the secondary bounding lines.

If a first sound object is within the threshold angle, relative to the user position, of a second sound object ("Yes" at 1314), then, at 1316, control circuitry 810 adjusts a virtual position of either the first sound object or the second sound object by an adjustment angle, relative to the user position. For example, the adjustment angle may be two degrees. The virtual position of the sound object is thus adjusted by a linear distance corresponding to an angular distance of two degrees from the gaze path and the distance from the plane of display of the content. The adjustment angle may also be a dynamic value that changes based on the distance between the user and the virtual position of the sound object to be moved. For example, if the sound object to be moved is close to the user position, a larger angular distance may be needed to move the sound object by a sufficient linear distance than a sound object that is farther from the user position.

At 1318, control circuitry 810 determines whether either the threshold angle or the adjustment angle are at a minimum value. Below a minimum value, adjustments of virtual positions of sound objects cease to effectively separate the sound objects. When sound objects are repositioned, the distance between sound objects considered to be too close together must be reduced so that the adjusted positions do not end up being considered too close to other sound objects. If neither the threshold angle nor the adjustment angle has reached a minimum value ("No" at 1318), then, at 1320, the threshold angle and adjustment angle are decreased. Processing then returns to 1314 and proceeds iteratively until the threshold angle or adjustment angle reaches a minimum value ("Yes" at 1318) or there are no more sound objects within the threshold angle, relative to the user position, of the second sound object ("No" at 1314).

The actions or descriptions of FIG. 13 may be used with any other embodiment of this disclosure. In addition, the actions and descriptions described in relation to FIG. 13 may be done in suitable alternative orders or in parallel to further the purposes of this disclosure.

Figure 14:
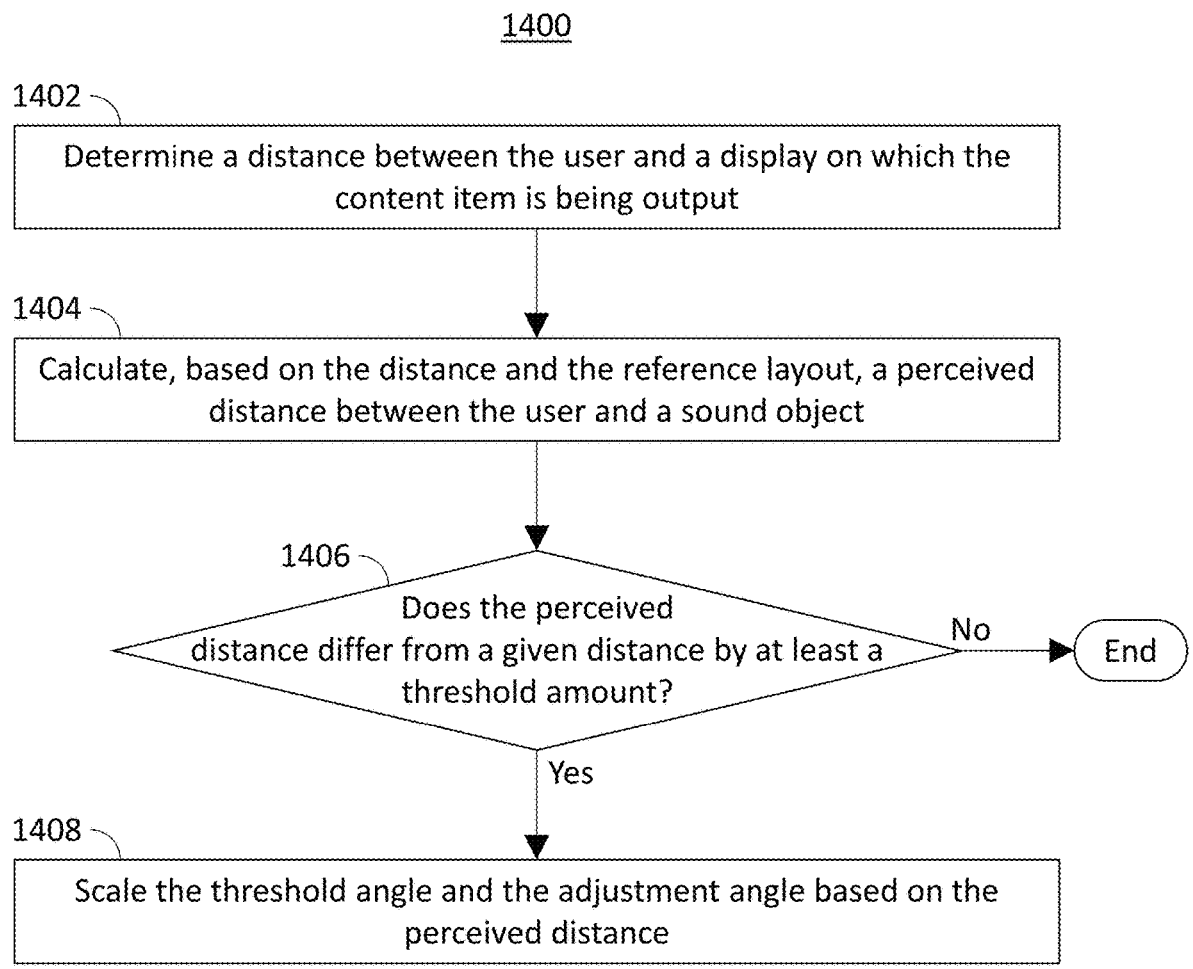
FIG. 14 is a flowchart representing an illustrative process for scaling a threshold angle and adjustment angle based on the distance between a user and a sound object, in accordance with some embodiments of the disclosure.

FIG. 14 is a flowchart representing an illustrative process 1400 for scaling a threshold angle and adjustment angle based on the distance between a user and a sound object, in accordance with some embodiments of the disclosure. Process 1400 may be implemented on control circuitry 810. In addition, one or more actions of process 1400 may be incorporated into or combined with one or more actions of any other process or embodiment described herein.

At 1402, control circuitry 810 determines a distance between the user and a display on which the content item is being output. For example, control circuitry 810 may use a camera, infrared sensor, or other imaging or ranging sensor to determine a distance between the user and the display. Alternatively, control circuitry 810 may separately determine distances from a first point (e.g., a sensor location) to the user and to the display. Control circuitry 810 may then calculate a distance between the user and the display based on these distances.

At 1404, control circuitry 810 calculates, based on the determined distance and the reference layout, a perceived distance between the user and a sound object. For example, the distance between the user and the display may be five feet, and the reference layout may indicate that a sound object is located ten feet from the plane of the display. Thus, the perceived distance between the user and the sound object is fifteen feet. Control circuitry 810 may also determine angles between the user and the display and between the plane of the display and the virtual position of the sound object. Based on these angles, the perceived distance between the user and the sound object can be more accurately calculated and accounts for the user's position relative to the display.

At 1406, control circuitry 810 determines whether the perceived distance differs from a given distance by at least a threshold amount. As distance from the user increases, linear distances corresponding to a given angular distance increase. Thus, if the perceived distance is greater than a set distance (e.g., ten feet), the threshold angle and adjustment angle should be smaller than if the perceived distance is less than the set distance. If the perceived distance differs from the given distance by at least a threshold amount ("Yes" at 1406), then, at 1408, control circuitry 810 scales the threshold angle and adjustment angle accordingly.

The actions or descriptions of FIG. 14 may be used with any other embodiment of this disclosure. In addition, the actions and descriptions described in relation to FIG. 14 may be done in suitable alternative orders or in parallel to further the purposes of this disclosure.

Figure 15:
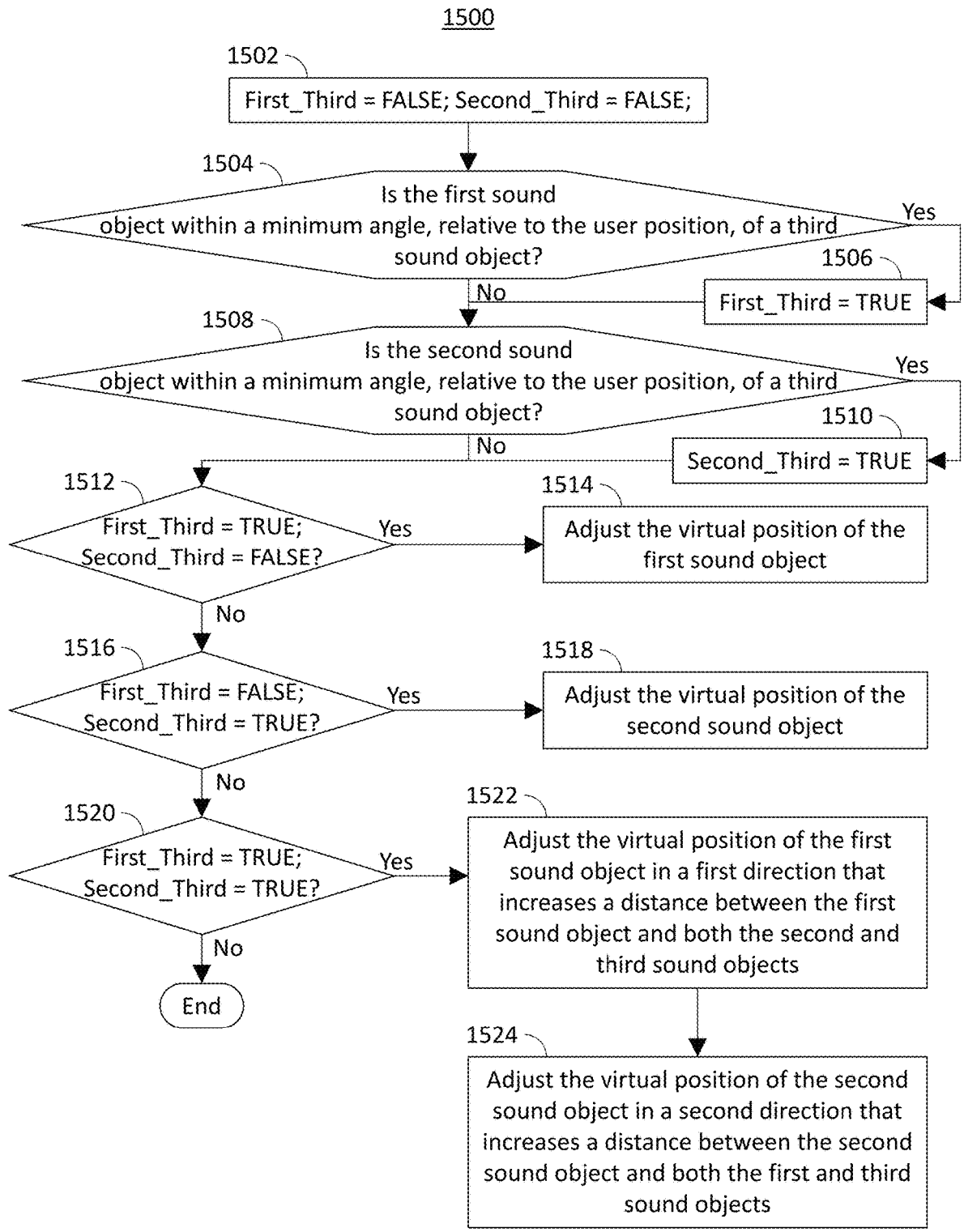
FIG. 15 is a flowchart representing an illustrative process for adjusting virtual positions of clustered sound objects, in accordance with some embodiments of the disclosure.

FIG. 15 is a flowchart representing an illustrative process 1500 for adjusting virtual positions of clustered sound objects, in accordance with some embodiments of the disclosure. Process 1500 may be implemented on control circuitry 810. In addition, one or more actions of process 1500 may be incorporated into or combined with one or more actions of any other process or embodiment described herein.

At 1502, control circuitry 810 initializes two Boolean flags, First_Third and Second_Third, setting both flags to FALSE. At 1504, control circuitry 810 determines whether the first sound object is within a minimum angle (e.g., the threshold angle), relative to the user position, of a third sound object. If not ("No" at 1504), processing continues at 1508. If so ("Yes" at 1504), then, at 1506, control circuitry 810 sets the value of First_Third to TRUE. Control circuitry 810 then, at 1508, determines whether the second sound object in within a minimum angle, relative to the user position, of the third sound object. If not ("No" at 1508), processing continues at 1512. If so ("Yes" at 1508), then, at 1510, control circuitry 810 sets the value of Second_Third to TRUE.

Control circuitry 810 then, at 1512, checks the values of both flags. If First_Third is TRUE and Second_Third is FALSE ("Yes" at 1512), then, at 1514, control circuitry 810 adjusts the virtual position of the first sound object. If First_Third is FALSE and Second_Third is TRUE ("Yes" at 1516), then, at 1518, control circuitry 810 adjusts the virtual position of the second sound object. If both flags are TRUE ("Yes" at 1520), then, at 1522, control circuitry 810 adjusts the virtual position of the first sound object in a first direction that increases the distance between the first sound object and both the second sound object and the third sound object. At 1524, control circuitry 810 adjusts the virtual position of the second sound object in a second direction that increases the distance between the second sound object and both the first sound object and the third sound object.

The actions or descriptions of FIG. 15 may be used with any other embodiment of this disclosure. In addition, the actions and descriptions described in relation to FIG. 15 may be done in suitable alternative orders or in parallel to further the purposes of this disclosure.

Figure 16:
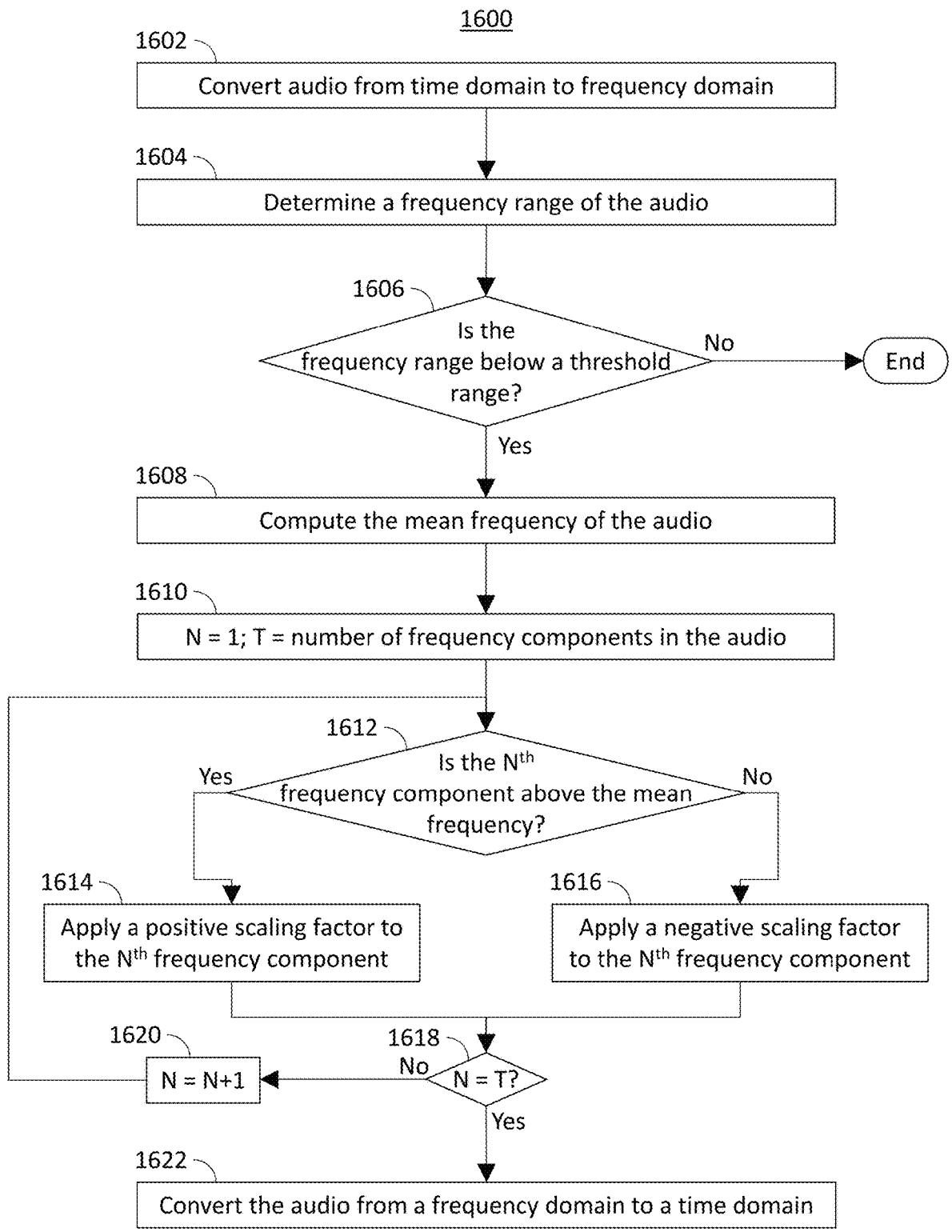
FIG. 16 is a flowchart representing an illustrative process for frequency spreading of audio of a sound object, in accordance with some embodiments of the disclosure.

FIG. 16 is a flowchart representing an illustrative process 1600 for frequency spreading of audio of a sound object, in accordance with some embodiments of the disclosure. Process 1600 may be implemented on control circuitry 810. In addition, one or more actions of process 1600 may be incorporated into or combined with one or more actions of any other process or embodiment described herein.

At 1602, control circuitry 810 converts audio of a sound object from a time domain to a frequency domain. For example, control circuitry 810 performs a Fourier transform operation to identify all the frequency components of the audio. At 1604, control circuitry 810 determines a frequency range of the audio. Control circuitry 810 may subtract the lowest frequency value from the highest frequency value. For example, the lowest frequency component may have a frequency of 500 Hz and the highest frequency component may have a frequency of 800 Hz. Control circuitry 810 may therefore determine that the audio have a frequency range of 300 Hz.

At 1606, control circuitry 810 determines whether the frequency range is below a threshold range. Control circuitry 810 may compare the frequency range of the audio to a threshold value. For example, the threshold value may be 500 Hz. If the range of the audio is only 300 Hz, as in the example above, then control circuitry 810 determines that the frequency range is below the threshold range. If the frequency range meets or exceeds the threshold range ("No" at 1606), then the process ends.

If the frequency range of the audio is below the threshold range ("Yes" at 1606), then, at 1608, control circuitry 810 computes the mean frequency of the audio. Control circuitry 810 calculates an average frequency from all the frequency components of the audio. At 1610, control circuitry 810 initializes a counter variable N, setting its value to one, and a variable T representing the number of frequency components in the audio. At 1612, control circuitry 810 determines whether the $N^{th}$ frequency component is above the mean frequency. If so ("Yes" at 1612), then, at 1614, control circuitry 810 applies a positive scaling factor to the $N^{th}$ frequency component. The positive scaling factor may be a positive number, or may be a value that, when used to scale the $N^{th}$ frequency component, results in additional frequency components at higher frequencies than that of the $N^{th}$ frequency component. If the $N^{th}$ frequency component is not above the mean frequency ("No" at 1612), then, at 1616, control circuitry 810 applies a negative scaling factor to the $N^{th}$ frequency component. The negative scaling factor may be a negative number, or may be a value that, when used to scale the $N^{th}$ frequency component, results in additional frequency components at lower frequencies than that of the $N^{th}$ frequency component.

After scaling the $N^{th}$ frequency component, at 1618, control circuitry 810 determines whether N is equal to T, meaning that all frequency components have been scaled. If not ("No" at 1618), then, at 1620, control circuitry 810 increments the value of N by one and processing returns to 1612. If N is equal to T ("Yes" at 1618), then, at 1622, control circuitry 810 converts the audio from a frequency domain to a time domain. For example, control circuitry 810 may perform an inverse Fourier transform operation. This results in a new audio signal to replace the audio of the sound object.

The actions or descriptions of FIG. 16 may be used with any other embodiment of this disclosure. In addition, the actions and descriptions described in relation to FIG. 16 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for orientation-responsive audio enhancement, the method comprising:
    identifying, within a content item, a plurality of virtual sound objects;
    extracting, from the content item, location metadata for each respective virtual sound object;
    generating a reference layout, relative to a user position, for the plurality of virtual sound objects based on the location metadata;
    detecting a gaze of the user;
    identifying, based on the reference layout, at least two virtual sound objects of the plurality of virtual sound objects, along a path defined by the gaze of the user;
    analyzing audio of each of the at least two virtual sound objects along the path defined by the gaze of the user;
    determining, based on the analyzing, that a first virtual sound object of the at least two virtual sound objects comprises a voice; and
    based on determining that the first virtual sound object comprises a voice, enhancing the audio of the first virtual sound object.

2. The method of claim 1, wherein enhancing audio of the virtual sound object further comprises modifying an amplitude of audio of at least one virtual sound object.

3. The method of claim 1, further comprising:
identifying a plurality of users consuming the content item; and
for each user of the plurality of users, determining second location metadata corresponding to locations of each other user of the plurality of users;
wherein the plurality of virtual sound objects includes the plurality of users.

4. The method of claim 1, further comprising:
receiving a negative input; and
in response to the negative input:
stopping enhancement of audio of the first virtual sound object;
selecting a second virtual sound object of the at least two virtual sound objects; and
enhancing audio of the second virtual sound object.

5. The method of claim 4, wherein the negative input is a gesture.

6. The method of claim 4, wherein the negative input is a speech input.

7. The method of claim 1, further comprising:
generating for display a representation of each virtual sound object of the at least two virtual sound objects;
detecting a second gaze of the user; and
identifying a representation of a virtual sound object, of the representations of the at least two virtual sound objects, along a second path defined by the second gaze of the user.

8. The method of claim 1, wherein the gaze is a second gaze and wherein determining the second gaze of the user comprises:
identifying a first gaze of the user;
receiving movement data from a device associated with the user; and
determining, based on the movement data, the second gaze of the user.

9. The method of claim 1, wherein detecting the gaze of the user comprises:
tracking pupils of the user;
determining, based on the tracking, a direction in which the pupils of the user are focused; and
determining the gaze based on the direction.

10. The method of claim 1, wherein detecting the gaze of the user comprises:
tracking an orientation of a head of the user; and
determining, based on the orientation of the head of the user, the gaze of the user.

11. The method of claim 1, wherein the audio of the first virtual sound object is enhanced without enhancing audio of the other of the plurality of the virtual sound objects.

12. A system for orientation-responsive audio enhancement, the system comprising:
input/output circuitry configured to receive a content item; and
control circuitry configured to:
identify, within the content item, a plurality of virtual sound objects;
extract, from the content item, location metadata for each respective virtual sound object;
generate a reference layout, relative to a user position, for the plurality of virtual sound objects based on the location metadata;
detect a gaze of the user;
identify, based on the reference layout, at least two virtual sound objects of the plurality of virtual sound objects along a path defined by the gaze of the user;
analyze audio of each of the at least two virtual sound objects along the path defined by the gaze of the user;
determine, based on the analyzing, that a first virtual sound object of the at least two virtual sound objects comprises a voice; and
based on determining that the first virtual sound object comprises a voice, enhance the audio of the first virtual sound object.

13. The system of claim 12, wherein the control circuitry configured to enhance audio of the virtual sound object is further configured to modify an amplitude of audio of at least one virtual sound object.

14. The system of claim 12, wherein the control is further configured to:
identify a plurality of users consuming the content item; and
for each user of the plurality of users, determine second location metadata corresponding to locations of each other user of the plurality of users;
wherein the plurality of virtual sound objects includes the plurality of users.

15. The system of claim 12, wherein the control circuitry is further configured to:
receive a negative input; and
in response to the negative input:
stop enhancement of audio of the first virtual sound object;
select a second virtual sound object of the subset of virtual sound objects; and
enhance audio of the second virtual sound object.

16. The system of claim 15, wherein the negative input is a gesture.

17. The system of claim 15, wherein the negative input is a speech input.

18. The system of claim 12, wherein the control circuitry is further configured to:
generate for display a representation of each virtual sound object of the at least two virtual sound objects;
detect a second gaze of the user; and
identify a representation of a virtual sound object, of the representations of the at least two virtual sound objects, along a second path defined by the second gaze of the user.

19. The system of claim 12, wherein the gaze is a second gaze and wherein the control circuitry configured to determine the second gaze of the user is further configured to:
identify a first gaze of the user;
receive movement data from a device associated with the user; and
determine, based on the movement data, the second gaze of the user.

20. The system of claim 12, wherein the control circuitry configured to detect the gaze of the user is further configured to:
track pupils of the user;
determine, based on the tracking, a direction in which the pupils of the user are focused; and
determine the gaze based on the direction.

21. The system of claim 12, wherein the control circuitry configured to detect the gaze of the user is further configured to:
track an orientation of a head of the user; and
determine, based on the orientation of the head of the user, the gaze of the user.

22. The system of claim 12, wherein the audio of the first virtual sound object is enhanced without enhancing audio of the other of the plurality of the virtual sound objects.

23. A method for orientation-responsive audio enhancement, the method comprising:
- identifying, within a content item, a plurality of virtual sound objects;
- extracting, from the content item, location metadata for each respective virtual sound object;
- generating a reference layout, relative to a user position, for the plurality of virtual sound objects based on the location metadata;
- detecting a gaze of the user;
- identifying, based on the reference layout, at least two virtual sound objects, of the plurality of virtual sound objects, along a path defined by the gaze of the user;
- based on identifying the at least two virtual sound objects along the path defined by the gaze of the user, generating for display at least two representations respectively corresponding to the at least two virtual sound objects;
- receiving a selection of a first representation of the at least two representations; and
- based on the received selection, enhancing the audio of a first virtual sound object corresponding to the first representation.

24. The method of claim 23, wherein the audio of the first virtual sound object is enhanced without enhancing audio of the other of the plurality of the virtual sound objects.

* * * * *